(12) United States Patent
Eck et al.

(10) Patent No.: US 11,339,866 B2
(45) Date of Patent: May 24, 2022

(54) CONTINUOUSLY VARIABLE TRANSMISSION ENGINE BRAKING SYSTEM

(71) Applicant: TEAM Industries, Inc., Bagley, MN (US)

(72) Inventors: Brian George Eck, Bagley, MN (US); Jeffrey Paul Reddick, Bagley, MN (US); Allen Lloyd Olson, Hines, MN (US); Shane Clair Okeson, Bagley, MN (US)

(73) Assignee: TEAM Industries, Inc., Bagley, MN (US)

( * ) Notice: Subject to any disclaimer, the term of this patent is extended or adjusted under 35 U.S.C. 154(b) by 340 days.

(21) Appl. No.: 16/390,818

(22) Filed: Apr. 22, 2019

(65) Prior Publication Data
US 2019/0323593 A1 Oct. 24, 2019

Related U.S. Application Data

(60) Provisional application No. 62/731,343, filed on Sep. 14, 2018, provisional application No. 62/661,460, filed on Apr. 23, 2018.

(51) Int. Cl.
*F16H 55/56* (2006.01)
*F16H 29/12* (2006.01)
(Continued)

(52) U.S. Cl.
CPC .............. *F16H 55/56* (2013.01); *F16G 1/28* (2013.01); *F16H 9/14* (2013.01); *F16H 9/24* (2013.01); *F16H 29/12* (2013.01); *F16H 55/171* (2013.01)

(58) Field of Classification Search
CPC .............................. F16H 55/56; F16H 55/563
(Continued)

(56) References Cited

U.S. PATENT DOCUMENTS 2,986,043 A * 5/1961 Jaulmes ................. B62M 25/00
474/15
3,665,781 A * 5/1972 Kawamura ............ G11B 15/43
474/14
(Continued)

FOREIGN PATENT DOCUMENTS

| CN | 201407322 Y | 2/2010 |
| CN | 101526126 B | 12/2010 |

(Continued)

OTHER PUBLICATIONS

International Bureau, "International Preliminary Report on Patentability from PCT Application No. PCT/US2019/028556", from Foreign Counterpart to U.S. Appl. No. 16/390,818, filed Nov. 5, 2020, pp. 1 through 10, Published: WO.

(Continued)

*Primary Examiner* — Henry Y Liu
(74) *Attorney, Agent, or Firm* — Fogg & Powers LLC

(57) ABSTRACT

A drive clutch having an engine braking feature for a continuously variable transmission is provided. The drive clutch includes a post that is coupled to an output of an engine. A fixed sheave, coupled to the post, has a fixed sheave belt engagement face. A movable sheave assembly that includes a movable sheave belt engaging face, is configured to move axially on the post to move the movable sheave belt engaging face in relation to the fixed sheave belt engaging face depending on a rotational speed of the drive clutch. An idler bearing is mounted on the post at least in part between the movable sheave belt engaging face and the fixed sheave belt engaging face. The idler bearing includes a one-way rotational assembly and has an outer belt engag- (Continued)

ing surface with outward extending cogs configured to engage teeth of a belt to prevent slippage during engine braking.

17 Claims, 23 Drawing Sheets

(51) Int. Cl.
   *F16G 1/28* (2006.01)
   *F16H 9/24* (2006.01)
   *F16H 9/14* (2006.01)
   *F16H 55/17* (2006.01)

(58) Field of Classification Search
   USPC .............................. 474/13, 14, 15
   See application file for complete search history.

(56) References Cited

U.S. PATENT DOCUMENTS

| | | | | |
|---|---|---|---|---|
| 3,757,593 | A * | 9/1973 | Svenson | F16H 61/66227 474/12 |
| 3,777,583 | A * | 12/1973 | Talbot | F16H 55/563 474/14 |
| 3,939,720 | A * | 2/1976 | Aaen | F16H 55/563 474/14 |
| 3,958,461 | A * | 5/1976 | Aaen | F16H 55/563 474/14 |
| 4,568,315 | A * | 2/1986 | Tomiyori | F16H 55/56 474/17 |
| 6,149,540 | A * | 11/2000 | Johnson | F16H 9/18 474/14 |
| 6,406,390 | B1 * | 6/2002 | Roby | F16H 55/56 474/12 |
| 6,743,129 | B1 * | 6/2004 | Younggren | F16H 55/56 474/17 |
| 6,811,504 | B2 * | 11/2004 | Korenjak | F01B 1/12 474/13 |
| 6,958,024 | B2 * | 10/2005 | Takano | F16H 55/563 474/12 |
| 7,072,754 | B1 * | 7/2006 | Sherrod | B60W 10/103 477/44 |
| 7,674,197 | B2 * | 3/2010 | Aitcin | F16H 55/56 474/19 |
| 8,272,981 | B2 * | 9/2012 | Galletti | F16H 55/56 474/19 |
| 8,534,413 | B2 * | 9/2013 | Nelson | B60W 10/107 180/366 |
| 8,651,986 | B2 * | 2/2014 | Ochab | F16H 55/56 474/11 |
| 8,668,623 | B2 * | 3/2014 | Vuksa | F16H 63/067 477/80 |
| 9,057,432 | B1 * | 6/2015 | Bouffard | F16H 55/563 |
| 9,228,644 | B2 * | 1/2016 | Tsukamoto | F16H 55/563 |
| 9,353,835 | B2 * | 5/2016 | Sekiya | F16H 13/08 |
| RE47,798 | E * | 1/2020 | Tsukamoto | F16H 9/18 |
| 10,641,366 | B2 * | 5/2020 | Kuhl | F16H 55/56 |
| 2002/0032088 | A1 * | 3/2002 | Korenjak | F16H 9/12 474/14 |
| 2002/0155909 | A1 * | 10/2002 | Roby | F16H 55/56 474/14 |
| 2003/0221890 | A1 * | 12/2003 | Fecteau | F16H 61/66272 180/210 |
| 2004/0214668 | A1 * | 10/2004 | Takano | F16H 55/563 474/14 |
| 2011/0092325 | A1 * | 4/2011 | Vuksa | F16H 63/067 474/14 |
| 2014/0235382 | A1 * | 8/2014 | Tsukamoto | F16H 63/067 474/14 |
| 2015/0024882 | A1 * | 1/2015 | Ochab | F16H 63/067 474/19 |
| 2015/0111674 | A1 * | 4/2015 | Yuan | F16H 9/12 474/14 |
| 2018/0180141 | A1 * | 6/2018 | Kuhl | F16H 61/66245 |

FOREIGN PATENT DOCUMENTS

| | | |
|---|---|---|
| CN | 103343786 A | 10/2013 |
| CN | 204300258 U | 4/2015 |
| CN | 106812897 A | 6/2017 |
| JP | H06330995 A | 11/1994 |
| JP | 2003184972 A | 7/2003 |
| JP | 2004257458 A | 9/2004 |
| JP | 3160653 U | 7/2010 |
| JP | 2015001269 A | 1/2015 |

OTHER PUBLICATIONS

International Searching Authority, "International Search Report and Written Opinion from PCT Application No. PCT/US2019/028556", from Foreign Counterpart to U.S. Appl. No. 16/390,818, dated Jul. 4, 2019, pp. 1-14, Published: WO.

* cited by examiner

CONTINUOUSLY VARIABLE TRANSMISSION ENGINE BRAKING SYSTEM

CROSS-REFERENCE TO RELATED APPLICATIONS

This Application claims priority to U.S. Provisional Application Ser. No. 62/661,460, same title herewith, filed on Apr. 23, 2018 and U.S. Provisional Application Ser. No. 62/731,343, same title herewith, filed on Sep. 14, 2018, which are both incorporated in their entirety herein by reference.

BACKGROUND

A continuously variable transmission (CVT) is used in many different types of vehicles. A CVT is used to change transmission ratios between an engine output and a drivetrain of the vehicle. In a typical CVT system, a primary or drive clutch or drive pulley is coupled to receive a rotational output from an engine and a secondary or driven clutch or driven pulley is coupled to provide a rotational output to the drivetrain. The primary clutch is coupled to provide torque to the secondary clutch with an endless loop drive belt. In changing transmission ratios, typically the primary clutch is comprised of first and second conical-faced sheave portions that are configured in a way to move the second conical-faced sheave portion axially in relation to the first conical-faced sheave portion along an axis of rotation. In this system the distance between the sheaves of the primary clutch determines the positioning of the drive belt in relation to the rotational axis and hence the transmission ratio. In particular, the closer the first and second sheave portions are positioned together, the farther the drive belt is pinched on the conical-faces away from the rotational axis of the primary clutch. Likewise, the farther the first and second sheave portions are positioned away from each other, the closer the drive belt is to the rotational axis of the primary clutch. When the engine is at idle speeds, the first and second sheaves of the primary clutch are axially positioned at a select distance from each other so at least one of the conical faced sheave portions does not engage a side of the drive belt. In this situation, the limited friction between the drive belt and the primary clutch allows the belt to slip so no rotational force is applied to the secondary clutch or pulley and hence no power is provided to the drive train by the engine.

Engine braking is a term used to describe when the engine of a vehicle is used to provide at least some of the braking for the vehicle. An example situation where engine braking is beneficial occurs when a vehicle is going down a steep decline and the operator cuts back on the throttle. In this situation the engine's rotational output will be slower than the rotation of the drive train. In an engine braking scheme, the slow rotation of the engine is used to slow down the rotation of the drive train. However, since the drive belt on a typical CVT system is designed to slip on the primary clutch during idle speeds of the motor, the engine effectively is disconnected from the drive train. This disconnection between the engine and the drive train prevents a typical CVT system from implementing engine braking. In this situation, other traditional braking means must be employed which may or may not be effective in a given situation.

SUMMARY

The following summary is made by way of example and not by way of limitation. It is merely provided to aid the reader in understanding some of the aspects of the subject matter described. Embodiments provide an effective and efficient engine braking system for a CVT.

In one embodiment, a drive clutch having an engine braking feature for a continuously variable transmission is provided. The drive clutch includes a post, a fixed sheave, a movable sheave assembly and an idler bearing. The post is configured to be coupled to an output of an engine. The fixed sheave is coupled to the post. The fixed sheave has a fixed sheave belt engagement face. The movable sheave assembly is mounted on the post. The movable sheave assembly has a movable sheave belt engaging face that is configured to move axially on the post to move the movable sheave belt engaging face in relation to the fixed sheave belt engaging face depending on a rotational speed of the drive clutch. The idler bearing is mounted on the post at least in part between the movable sheave belt engaging face of the movable sheave assembly and the fixed sheave belt engaging face of the fixed sheave. The idler bearing includes a one-way rotational assembly that allows rotation of the idler bearing in relation to the post in a first direction and prevents rotation of the idler bearing in a second direction to provide engine braking assistance. The idler bearing further has an outer belt engaging surface with outward extending cogs.

In another example embodiment, a vehicle with a continuously variable transmission with an engine braking function is provided. The vehicle includes an engine to produce torque. A continuously variable transmission, drivetrain and a belt. The continuously variable transmission includes a drive clutch and a driven clutch. The drive clutch includes a post, a fixed sheave, a movable sheave assembly and an idler bearing. The post is coupled to an output of the engine. The fixed sheave is coupled to the post. The fixed sheave has a fixed sheave belt engagement face. The movable sheave assembly is mounted on the post. The movable sheave assembly has a movable sheave belt engaging face that is configured to move axially on the post to move the movable sheave belt engaging face in relation to the fixed sheave belt engaging face depending on the rotational speed of the drive clutch. The idler bearing is mounted on the post at least in part between the movable sheave belt engaging face of the movable sheave assembly and the fixed sheave belt engaging face of the fixed sheave. The idler bearing included a one-way rotational assembly that allows rotation of the idler bearing in relation to the post in a first direction and prevents rotation of the idler bearing in a second direction to provide engine braking assistance. The idler bearing has an outer belt engaging surface with outward extending cogs. The belt is used to convey torque between the drive clutch and the drivetrain. The belt includes an inner surface having teeth that are configured to engage the cogs of the idler bearing when the movable sheave belt engaging face of the movable sheave assembly is positioned at least a distance of a width of the belt away from the fixed sheave belt engaging face of the fixed sheave.

In yet another embodiment, a belt for a continuously variable transmission is provided. The belt includes an inner surface that has inner protruding teeth that are configured to engage cogs of an idler bearing of a drive clutch when a movable sheave belt engaging face of a movable sheave assembly of the drive clutch is positioned at least a distance of a width of the belt away from a fixed sheave belt engaging face of a fixed sheave of the drive clutch.

In further another embodiment, a drive clutch of a continuously variable transmission having an engine braking function is provided. The drive clutch includes a post, a fixed sheave, a movable sheave assembly and idler bearing and a one-way rotational assembly. The post is configured to be coupled to an output of an engine. The fixed sheave is coupled to the post. The fixed sheave has a fixed sheave belt engagement face and a central recess. The movable sheave assembly is mounted on the post. The movable sheave assembly having a movable sheave belt engaging face that is configured to move axially on the post to move the movable sheave belt engaging face in relation to the fixed sheave belt engaging face depending on the rotational speed of the drive clutch. The idler bearing is mounted on the post. The idler bearing has a first portion that is positioned at least in part between the movable sheave belt engaging face of the movable sheave assembly and the fixed sheave belt engaging face of the fixed sheave and a second portion received within the central recess of the fixed sheave. The one-way rotational assembly is received within the central recess of the fixed sheave. The one-way rotation assembly engages the idler bearing to allow the idler bearing to rotate in relation to the post in a first direction and prevent rotation of the idler bearing in relation to the post in a second direction.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
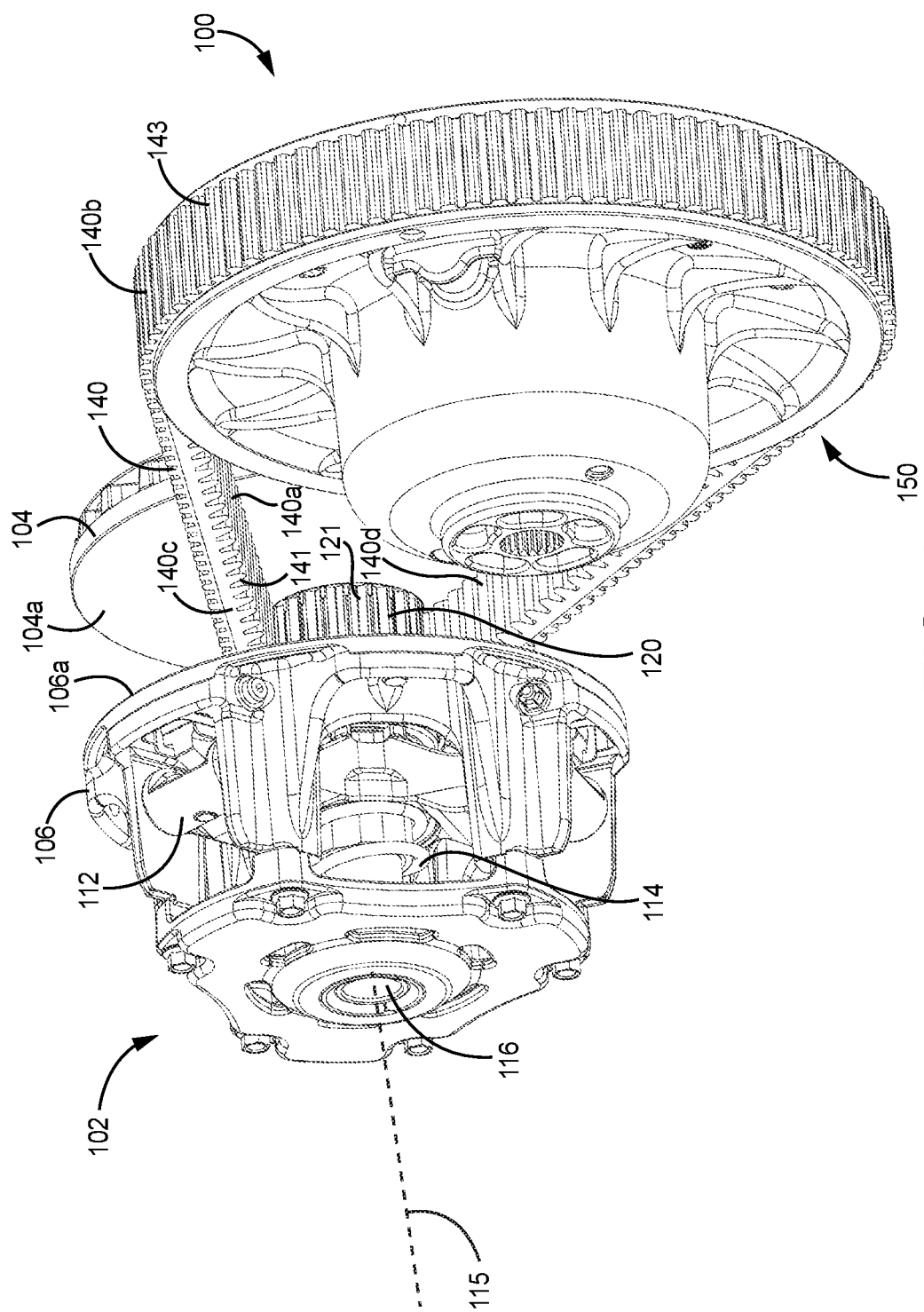
FIG. 1 is a side perspective view of a CVT system according to one exemplary embodiment.
Figure 2:
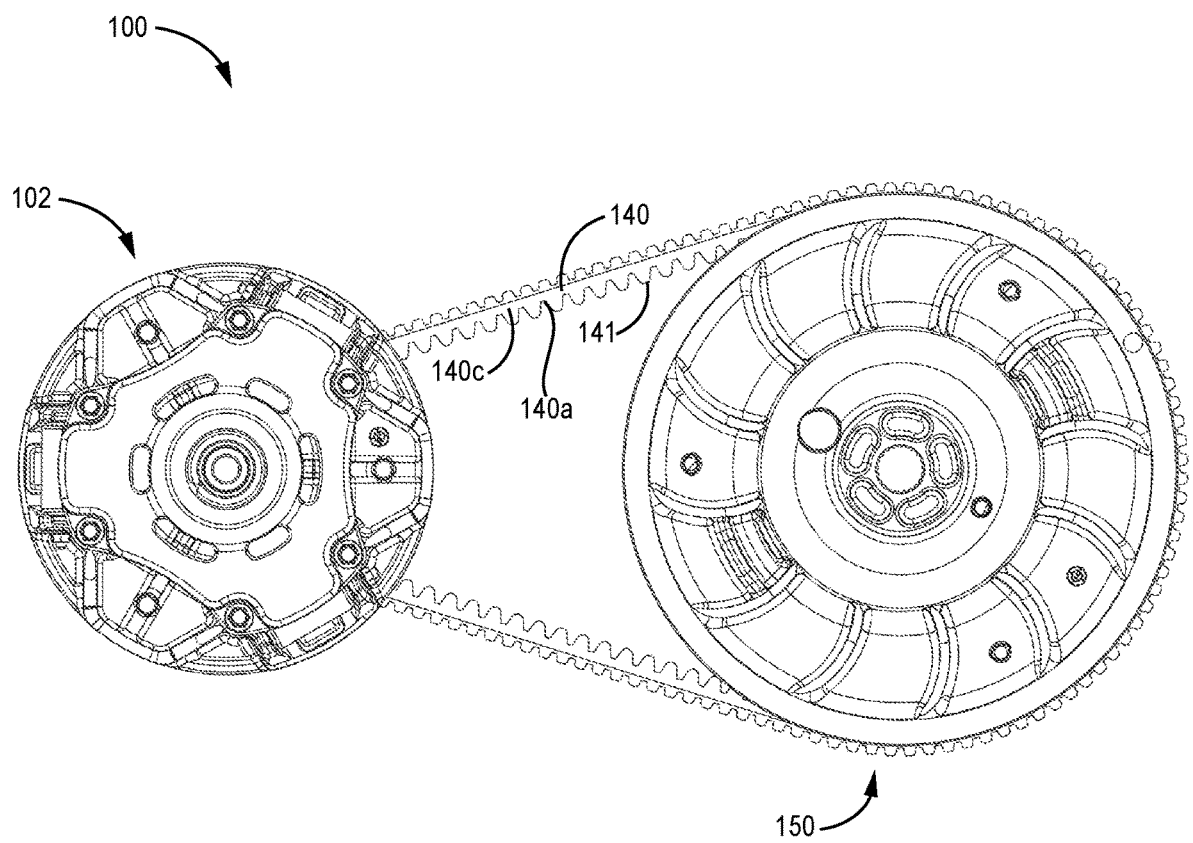
FIG. 2 is a side view of the CVT system of FIG. 1.

Embodiments provide engine braking systems for a continuously variable transmission (CVT). FIGS. 1 and 2 illustrates a CVT system 100 of one example embodiment. This example system 100 includes a drive clutch 102 and a driven pulley 150 (driven gear). In another embodiment, the driven pulley 150 may be a driven clutch. An endless loop 140 such as a belt 140 is used to couple rotation between the drive clutch 102 and the driven pulley 150.

The drive clutch 102 includes a fixed sheave 104 and a movable sheave assembly 106 both of which are mounted on a post 116. The movable sheave assembly 106 is configured to selectively move axially a conically shaped face portion 106a (movable sheave belt engaging surface) of the movable sheave assembly 106 along the post towards and away from the fixed sheave 104 depending on the rotational speed of the drive clutch 102. The post 116, which is rotationally coupled to an output of an engine (not shown in FIGS. 1 and 2), rotates about axis 115. In controlling the axial movement of the movable sheave assembly 106, the embodiment illustrated uses a spider 112, pivoting arms (not shown) and a biasing member 114 arrangement. As rotation of the drive clutch 102 increases, the pivoting arms pivot out pushing a portion of the movable sheave assembly 106 away from the spider 112 therein compressing the biasing member 114 and moving the conically shaped face portion 106a of the movable sheave closer to a conically shaped face portion 104a (fixed sheave belt engagement face) of the fixed sheave 104. As the movable sheave assembly 106 moves closer to the fixed sheave 104, the respective face portions 104a and 106a of the respective fixed sheave 104 and movable sheave assembly 106 engage side faces 140c and 140d of belt 140. The faster the rotation of the movable sheave assembly 106, the farther up the belt 140 rides therein changing the distance of the belt from axis 115 and a gear ratio (or transmission ratio) provided by the drive clutch 102. As the drive clutch 102 slows down, the movable sheave assembly 106 moves away from the fixed sheave 104 causing the belt 140 to move down towards the axis 115 therein again changing the gear ratio provided by the drive clutch 102.

When the movable sheave assembly 106 has moved away from the fixed sheave 104 so that at least one side face 140c and 140d of the belt 140 is no longer engaging a respective face portion 104a and 106a of the respective fixed sheave 104 and movable sheave assembly 106, an inner face 140a of the belt is engaged with an idler bearing 120. In some embodiments, the idler bearing 120 incorporates a one-way bearing configuration that allows the idler bearing 120 to rotate freely on the post 116 in a first direction so that when the vehicle is idling, torque is not transferred from the engine to the drive train. The idler bearing 120 is further configured, as discussed below in detail, to lock onto the rotation of the post when the belt is trying to overrun the idler bearing 120 (i.e. torque from the drivetrain is trying to overrun the torque provided by the engine). This configuration provides engine braking.

Figure 3:
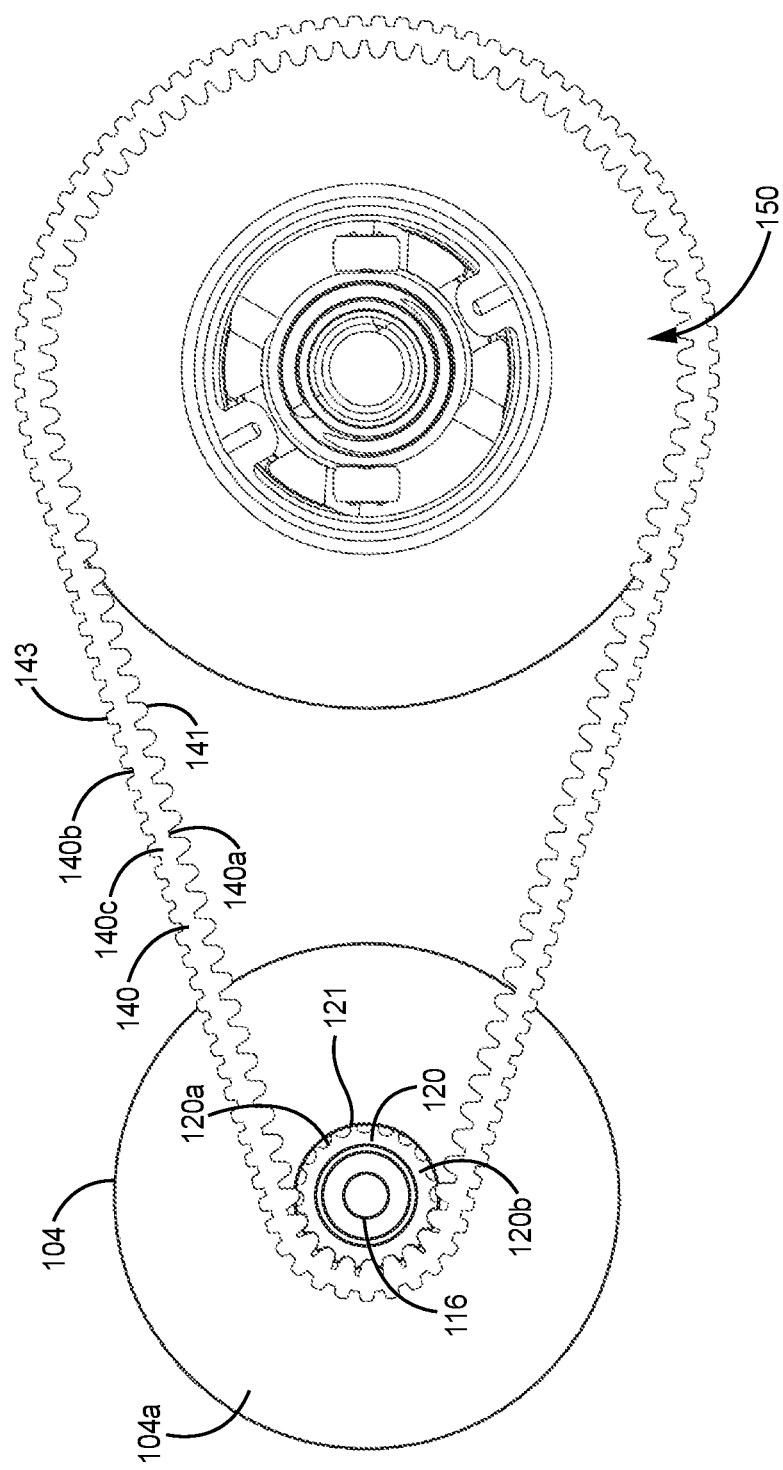
FIG. 3 is a cross-sectional side view of the CVT system of FIG. 1.
Figure 4:
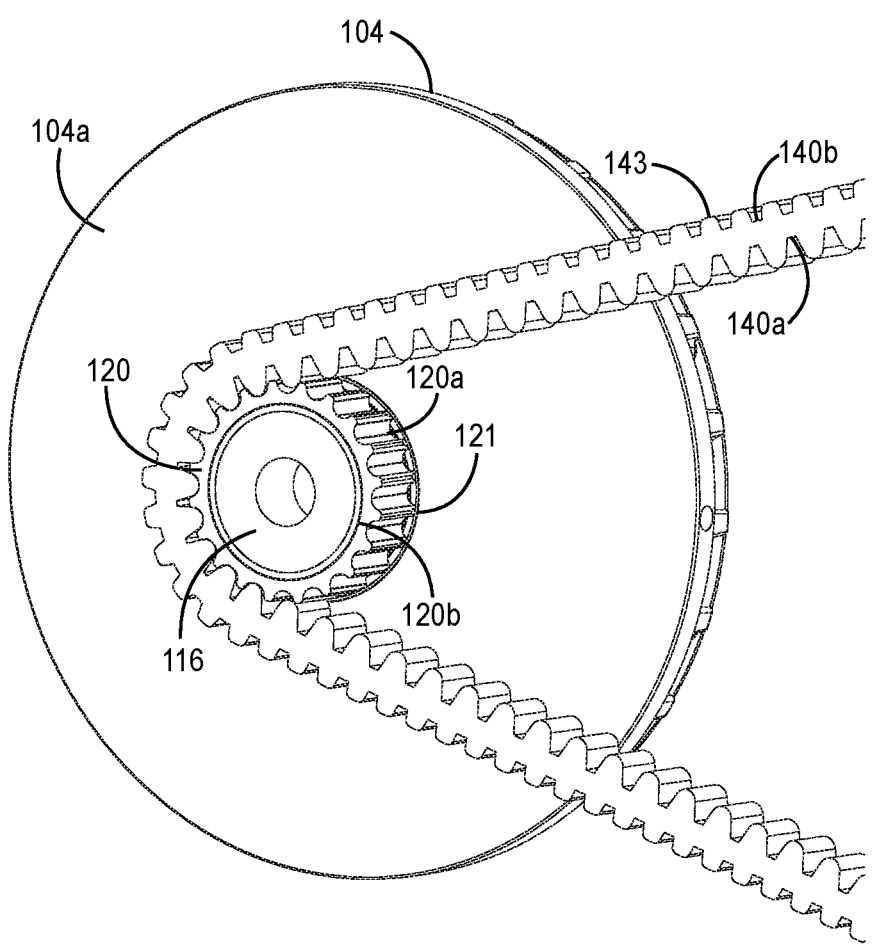
FIG. 4 is a cross-sectional side perspective view of a portion of the movable sheave assembly and belt of the CVT system of FIG. 1.

As best illustrated in FIGS. 3 and 4, in this embodiment, the idler bearing 120 includes an inner surface 120b that engages the post 116 and outer surface 120a in which spaced cogs 121 protrude. The spaced cogs 121 are designed to fit between spaced teeth 141 (or inner cogs) that protrude from an inner surface 140a of the belt 140. This cogs/teeth arrangement provides a connection that prevents slippage between the idler bearing 116 and the belt 140 during an engine braking situation. This cogs/teeth type of arrangement is especially helpful in improving engine braking in relatively heavy vehicles where idler surface/belt slippage is likely to occur. Belt 140 in this embodiment also has outer teeth 143 protruding from an outer surface 140b of the belt 140. The outer teeth 143 act as paddles to aid in cooling of the belt by increasing the outer belt surface area which improves heat dissipation and also to ensure continual air movement along the belt. These outer teeth 143 also increase belt flexibility and ability to wrap around the idler bearing.

Figure 5:
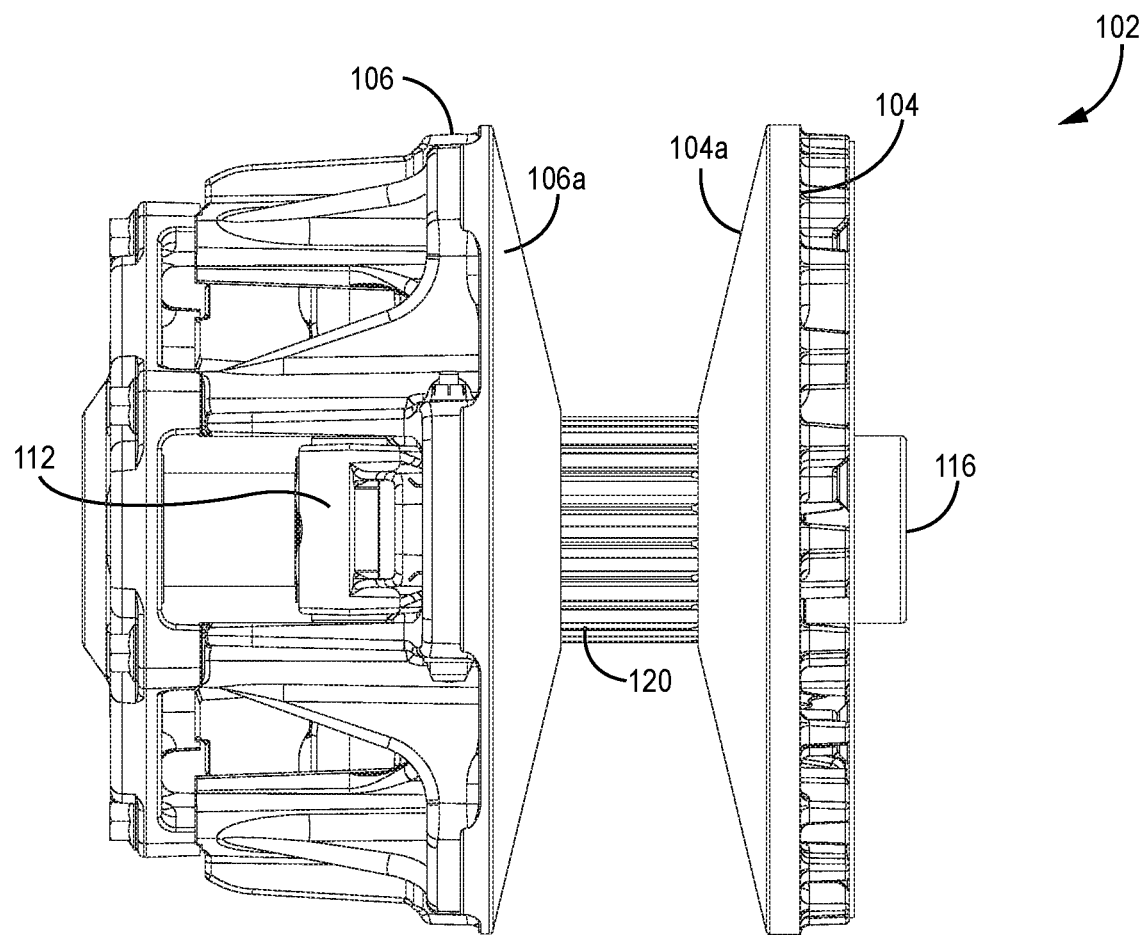
FIG. 5 is side view of an assembled drive clutch of the CVT system of FIG. 1.
Figure 6:
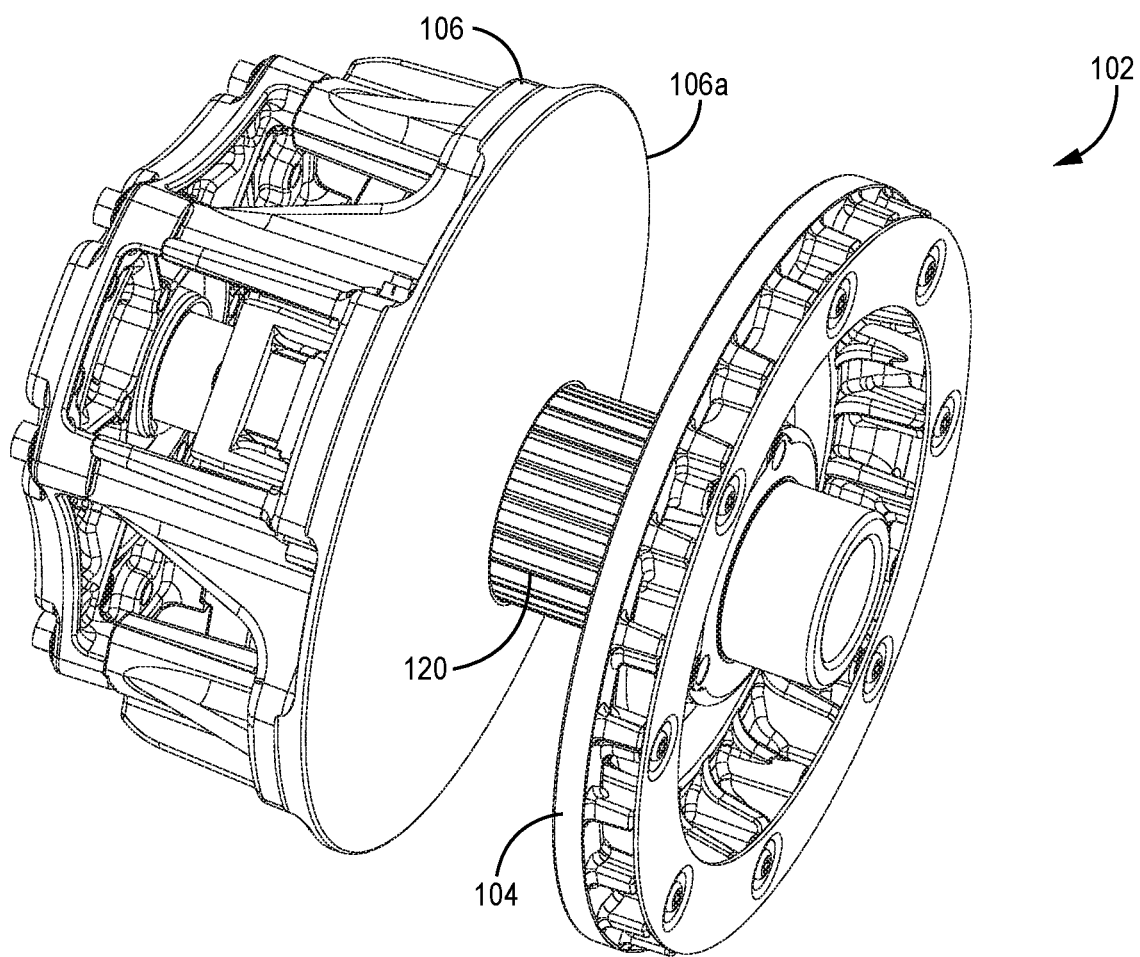
FIG. 6 is a side-perspective view of the drive clutch of the CVT system of FIG. 1.
Figure 7:
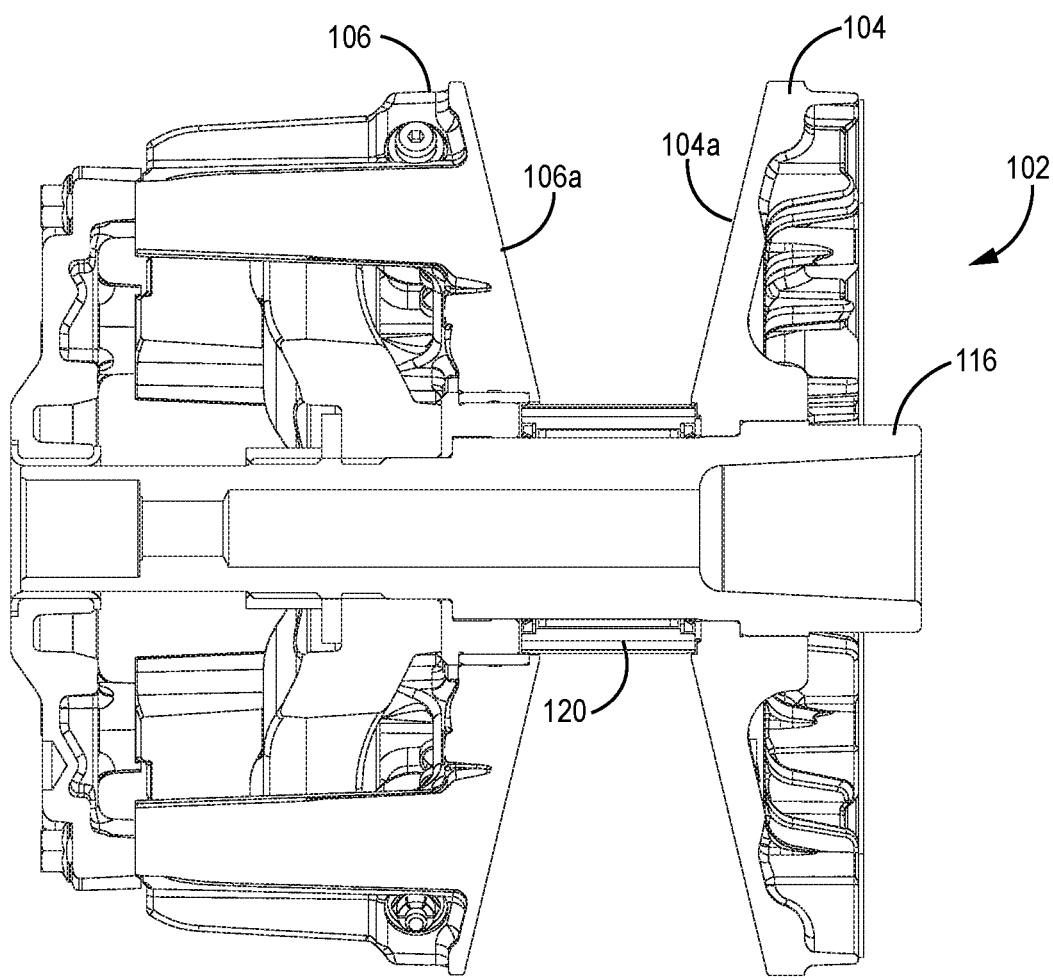
FIG. 7 is a cross-sectional side view of the drive clutch of the CVT system of FIG. 1.
Figure 8:
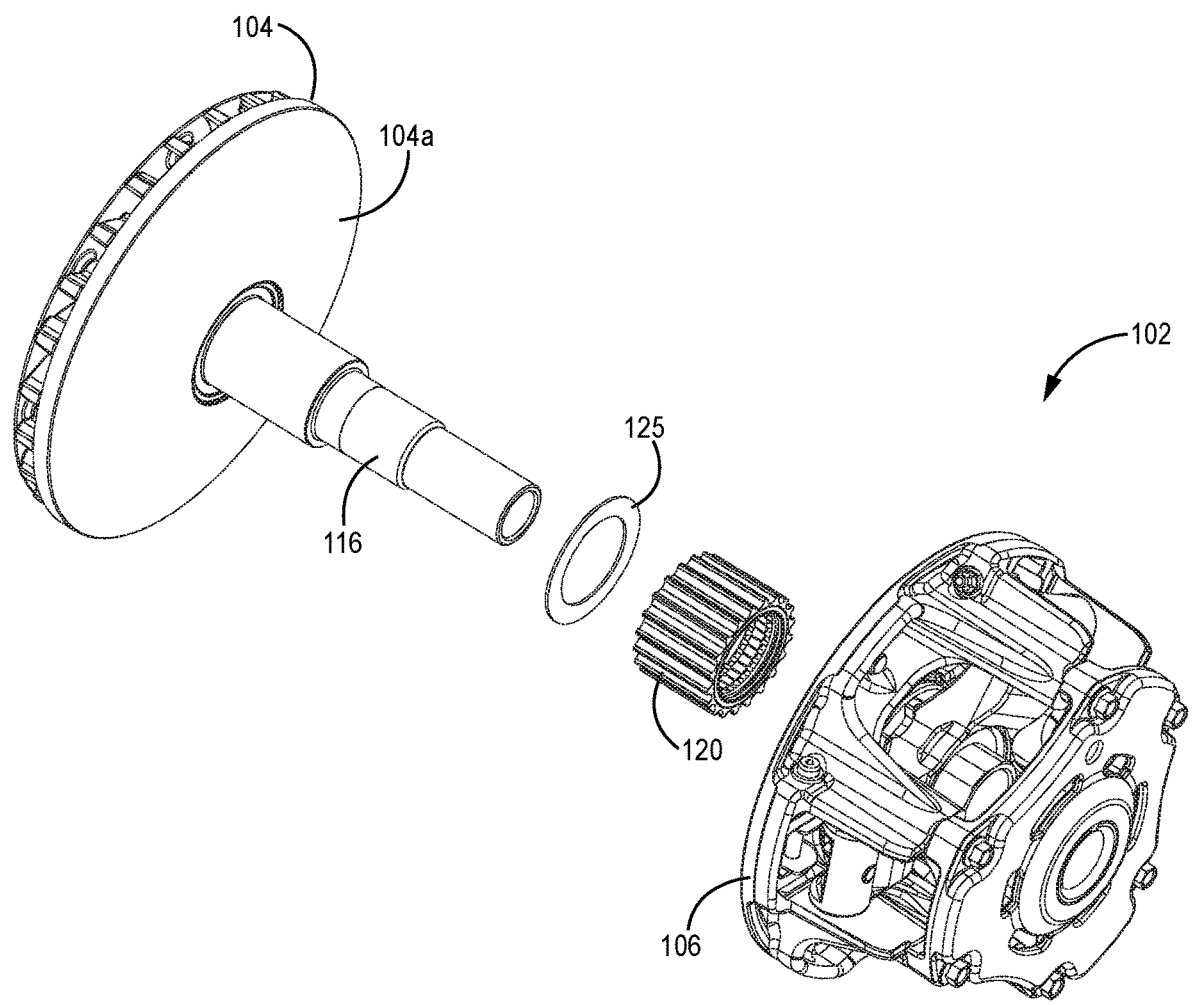
FIG. 8 is an unassembled side perspective view of the drive clutch of the CVT system of FIG. 1.
Figure 9:
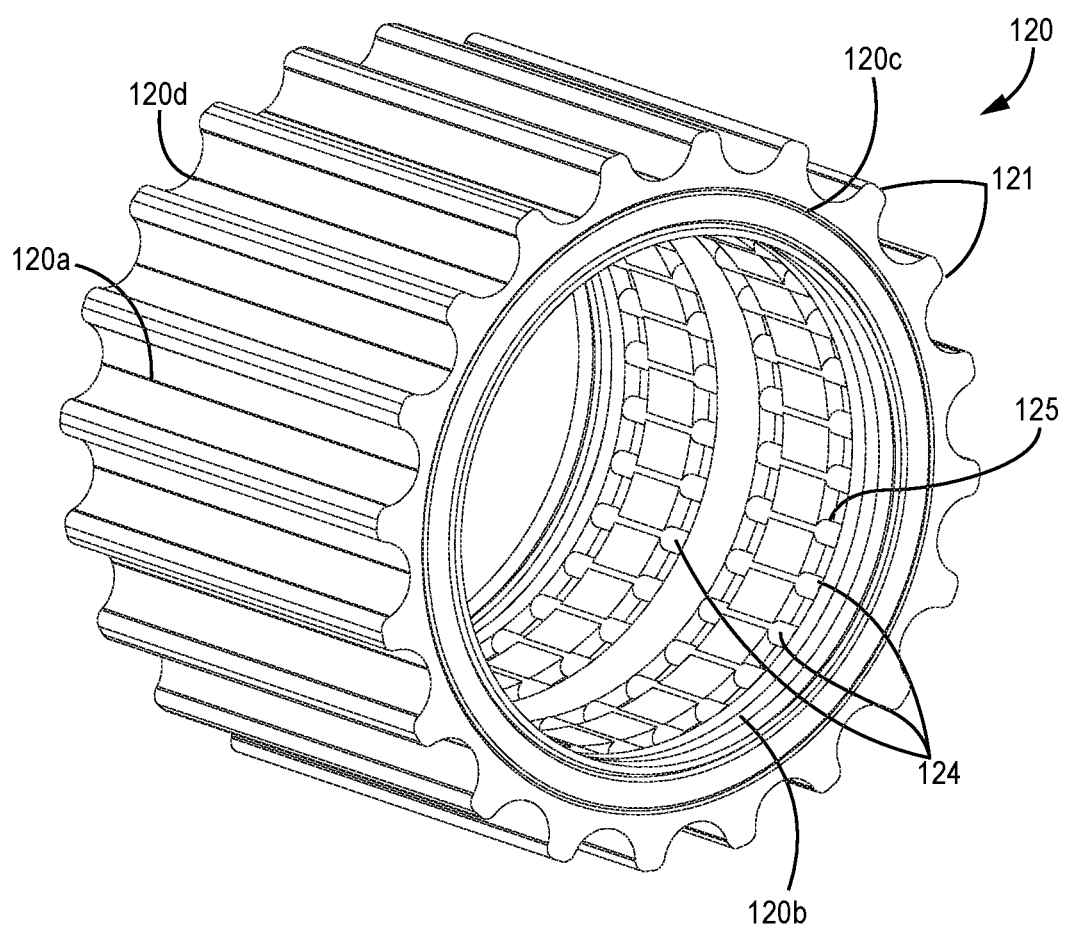
FIG. 9 is a side perspective view of an idler bearing according to one exemplary embodiment.

FIGS. 5 and 6 illustrates assembled views of the drive clutch 102. FIG. 7 illustrates a cross-sectional side view of the drive clutch 102. As illustrated in the Figures, the idler bearing 120 is mounted on a section of the post 116 and is positioned at least in part between the fixed sheave engagement face 104a of the fixed sheave 104 and the movable sheave engagement face 106a and of the movable sheave assembly 106. FIG. 8 illustrates an unassembled drive clutch 102. FIG. 9 illustrates a side perspective view of idler bearing 120. As discussed above, idler bearing 120 includes an outer surface 120a in which spaced cogs 121 protrude. The idler bearing 120 further has an inner surface 120b in which engages a section of the post 116 as discussed above. Within the inner surface 120b are housed a plurality of needle bearings 124 received in pockets 125. The needle bearings are positioned to at least partially engage the post 116. The needle bearings 124 and pockets 125 that hold the needle bearings 124 form a one-way rotational assembly that is designed to allow the needle bearings 124 to rotate freely within the pockets 125 in a first direction and prevent rotation of the needle bearings 124 within the pockets 125 when attempting to rotate the needle bearings 124 in a second direction. In one embodiment this is accomplished with a wedge shaped pocket. Further in an embodiment, a biasing member is use in concert with the wedge shaped pocket. Other types of one-way rotational assemblies may be used in concert with the idler bearing 120.

Figure 10:
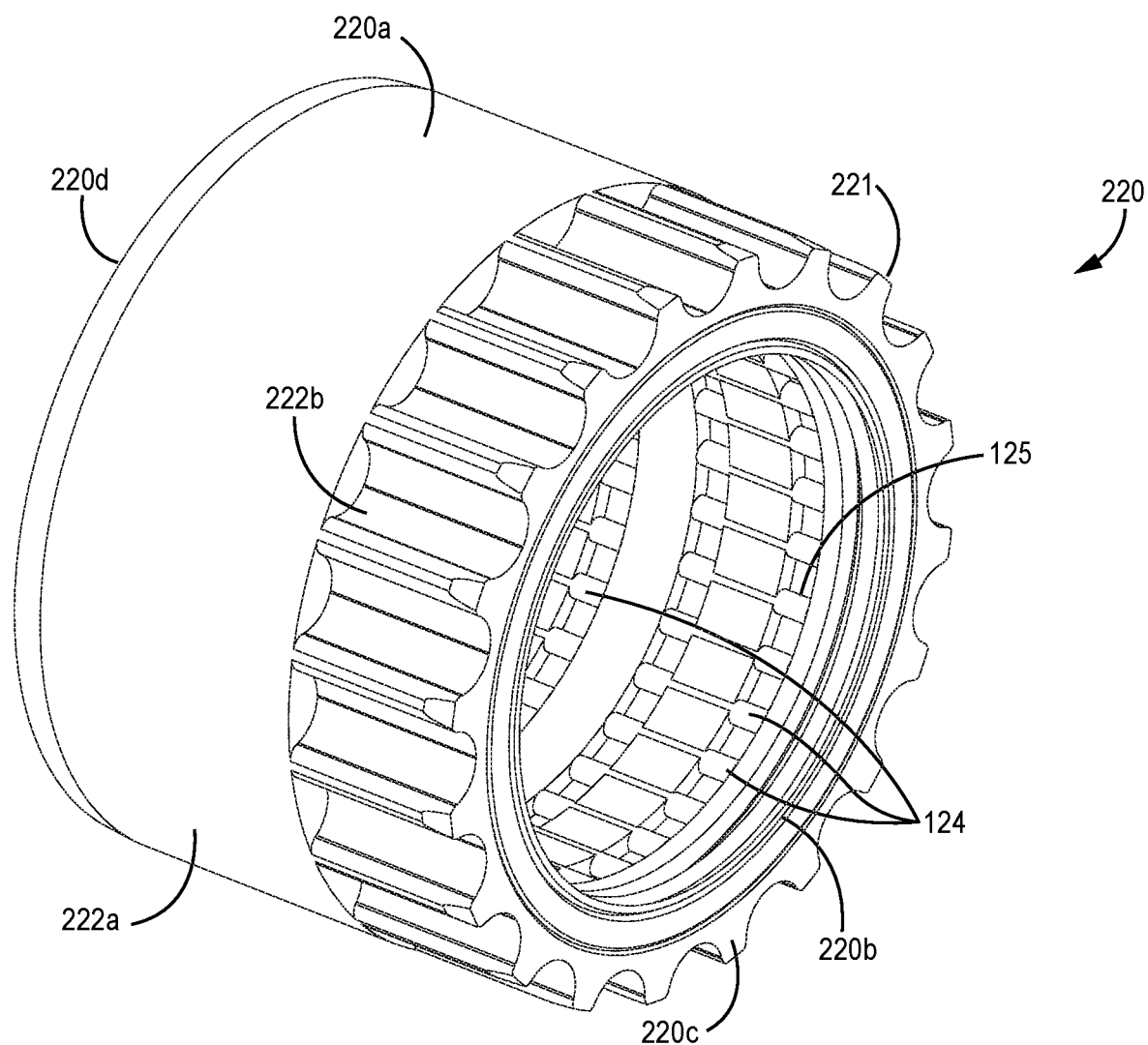
FIG. 10 is a side perspective view of another idler bearing according to one exemplary embodiment.

In the embodiment of the idler bearing 120 illustrated in FIG. 9, the cogs 121 extend across the entire width of the outer surface 120a from a first side 120c to a second side 120d of the idler bearing 120. Also in this embodiment, the teeth 141 on the inner surface of the belt 140 extend across the entire width of the belt 140 from the first side face 140c to the second side face 140d of the belt (as best illustrated in FIG. 1). FIG. 10 illustrates another embodiment where an idler bearing 220 includes an outer surface 220a in which cogs 221 do not extend across the entire width of the outer surface 220a between a first side 220c to a second side 220d of the idler bearing 220. In this example embodiment, a first portion 222a of the outer surface 220a of the idler bearing 220 is relatively smooth and a second portion 222b of the outer surface 220a of the idler bearing 220 includes cogs 221. In this embodiment, outer surface 220a of the idler bearing 220 is recessed in the second portion 222b from the first portion 222a with the cogs 221 extending outward to an outer diameter of the first portion 222a. The cogs 221 are aligned generally parallel with that rotational axis 115 of an associated drive clutch. In other embodiments, the cogs height may extend beyond the outer diameter of the second portion 222b or further in other embodiments, the cogs height may be below the outer diameter of the second portion 222b. The inner surface 220b of the idler bearing 220 includes needle bearings 124 received in pockets 125, as discussed above in regards to the first embodiment, the needle bearings 124 engage the post 116 of an associated drive clutch.

Figure 11:
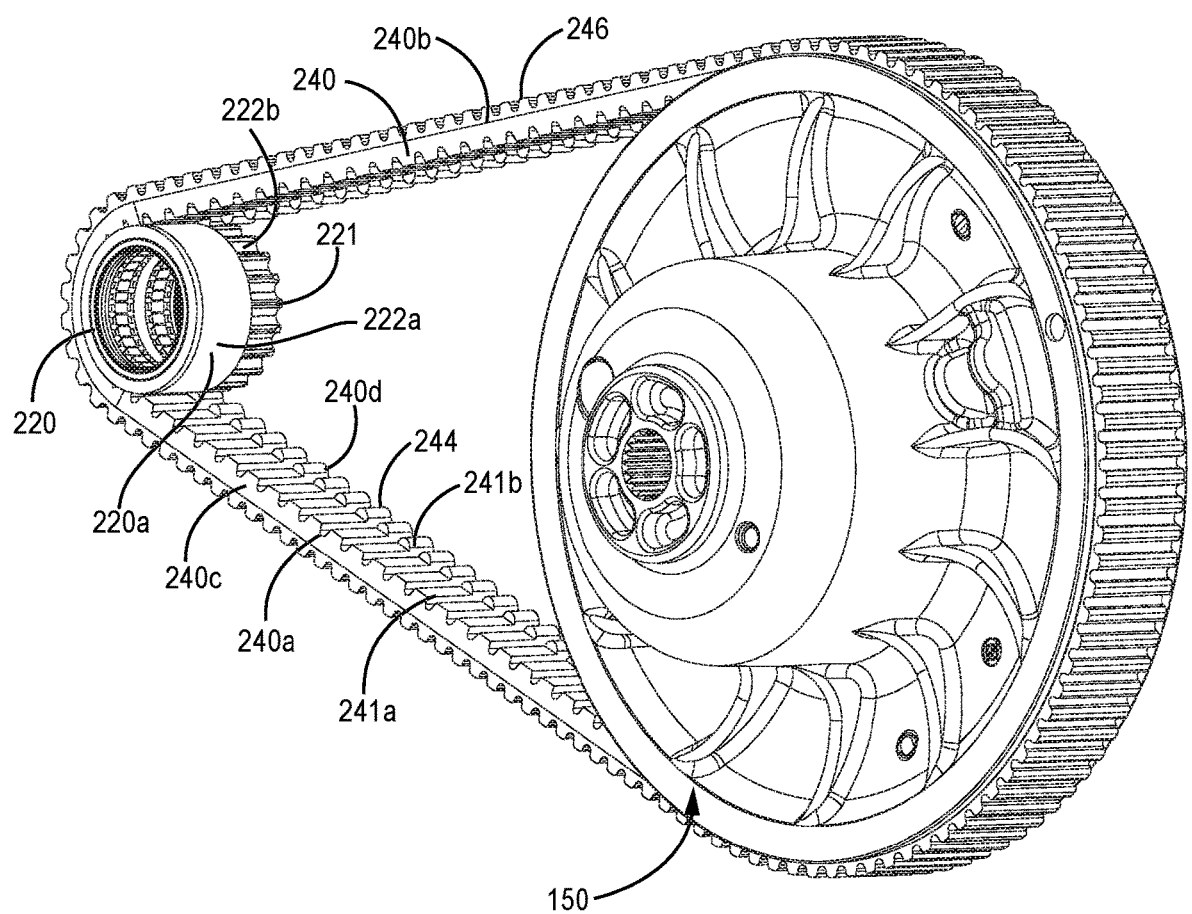
FIG. 11 is a side perspective view of the idler bearing of FIG. 10 engaged with a belt according to one exemplary embodiment.

FIG. 11 illustrates a belt 240 of an embodiment engaged with idler bearing 220 and a driven pulley 150. Belt 240 in an embodiment, includes an outer surface 240b that include outer protruding teeth 246 that extend across a width of the belt from a first side face 240c to a second side face 240d of the belt 240. In other embodiments, outer protruding teeth on the belt 240 are not used. An inner surface 240a of the belt 240 is configured to engage the idler bearing 220 when an associated drive clutch is idling. The inner surface 240a of the belt 240 includes a first portion 241a and a second portion 241b. The first portion 241a of the belt 240 is designed to engage the first portion 222a of the outer surface 220a of the idler bearing 220. The second portion 241b of the belt 240 includes protruding teeth 244 that are designed to be received between the cogs 221 on the second portion 222b of the idler bearing 220. The engagement of the teeth 244 of the belt 240 between the cogs 221 of the idler bearing 220 helps prevent movement (slippage) between the belt 240 and the idler bearing 220 during engine braking operations to increase engine braking efficiency. In one embodiment, the teeth 244 are initially formed across an entire width of the belt 240 and then a section of teeth 244 on the first portion 241a of the belt 240 are cut down so the belt 240 rides flush across the outer surface 220a of the idler bearing 220 during use.

Figure 12:
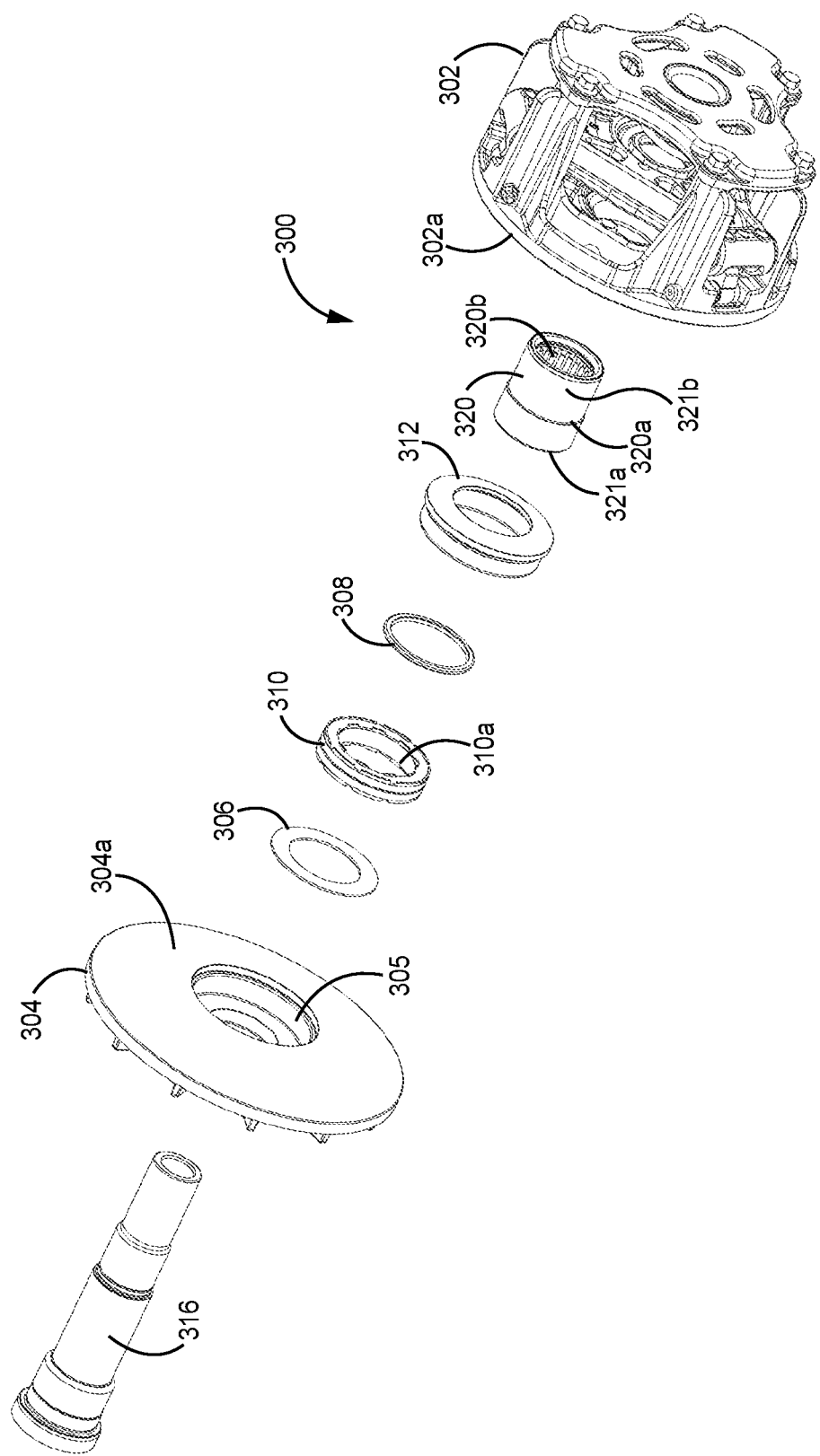
FIG. 12 is an unassembled side perspective view of a drive clutch according to another exemplary embodiment.

Another embodiment of a drive clutch 300 of a CVT is illustrated in the unassembled view of FIG. 12. The drive clutch 300 includes a fixed sheave 304 that is mounted on a post 316. The drive clutch 300 further includes a movable sheave assembly 302 that is mounted on the post 316. As with the embodiments discussed above the movable sheave assembly 302 is configured to selectively move axially on the post 316 to vary the distance between a fixed sheave belt engaging face 304a of the fixed sheave 304 and a movable sheave belt engaging face 302a of the movable sheave assembly 302. Also included in this embodiment is a thrust washer 306, a sprag 310, a seal 308, a sprag housing 312 and an idler bearing 320. The idler bearing 320 in this example embodiment, includes an outer surface 320a and inner surface 320b. The inner surface is configured to engage the post 316. Further the idler bearing has a first portion 321a and a second portion. The fixed sheave 304 includes a central recess 305 (or pocket) in which the thrust washer 306, sprag 310, seal 308, sprag housing 312 and the first portion 321a of the idler bearing 320 are received in. The second portion 321b of the outer surface 320a of the idler bearing 320 engages an inner surface of an endless loop, such as a belt, when the vehicle implementing the drive clutch is idling or turned off. In this embodiment, the sprag 310 and sprag housing 312 are in a configuration with the idler bearing 320 to form a one-way rotational assembly to allow the idler bearing to rotate on the post 316 in a first direction to allow of the idling of a vehicle using the CVT while preventing the rotation of the idler bearing 320 in relation to the post in a second direction to provide engine braking function via the CVT. Hence, instead of a one-way needle bearing/pocket arrangement as discussed in the above embodiment, the one-way rotation is provided in this example embodiment by a one-way sprag and sprag housing configuration.

Figure 13:
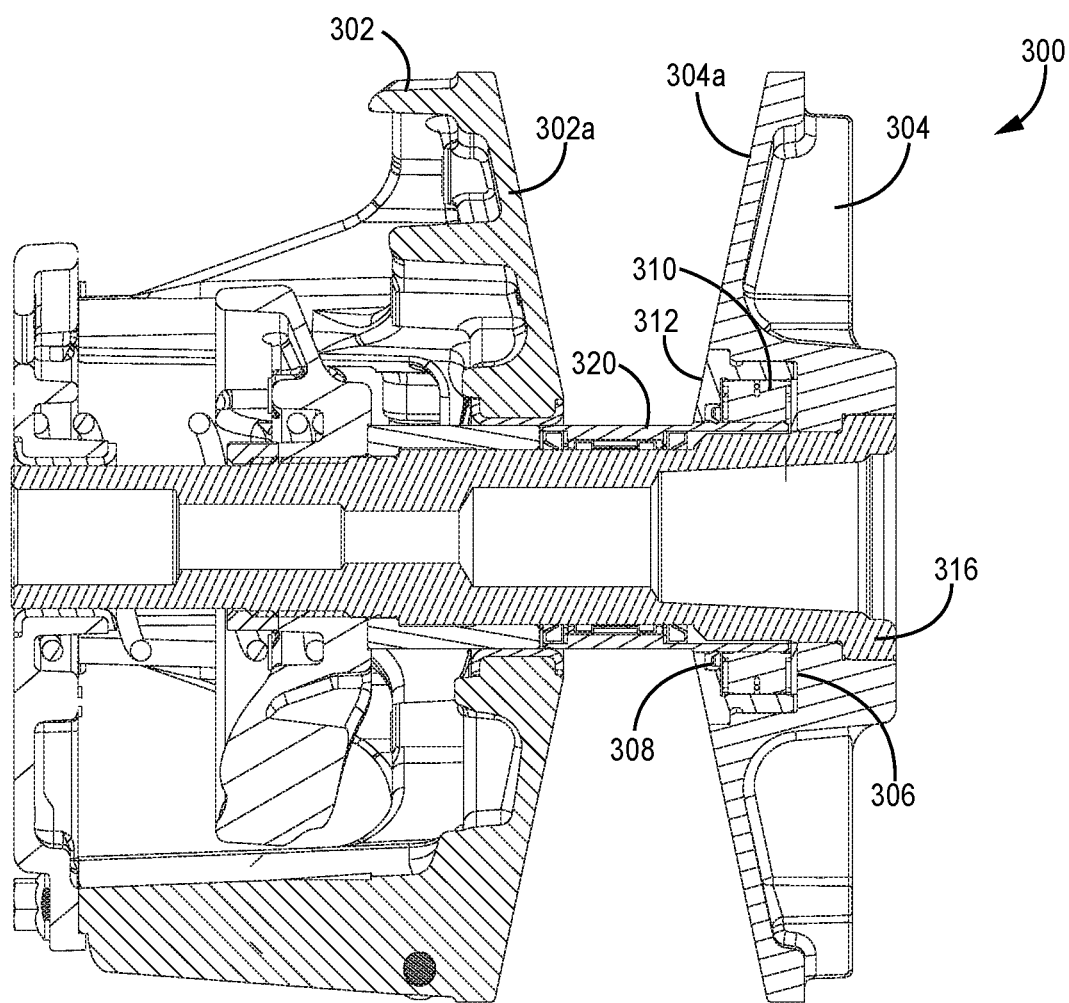
FIG. 13 is side cross-sectional side view of the drive clutch of FIG. 12.
Figure 14:
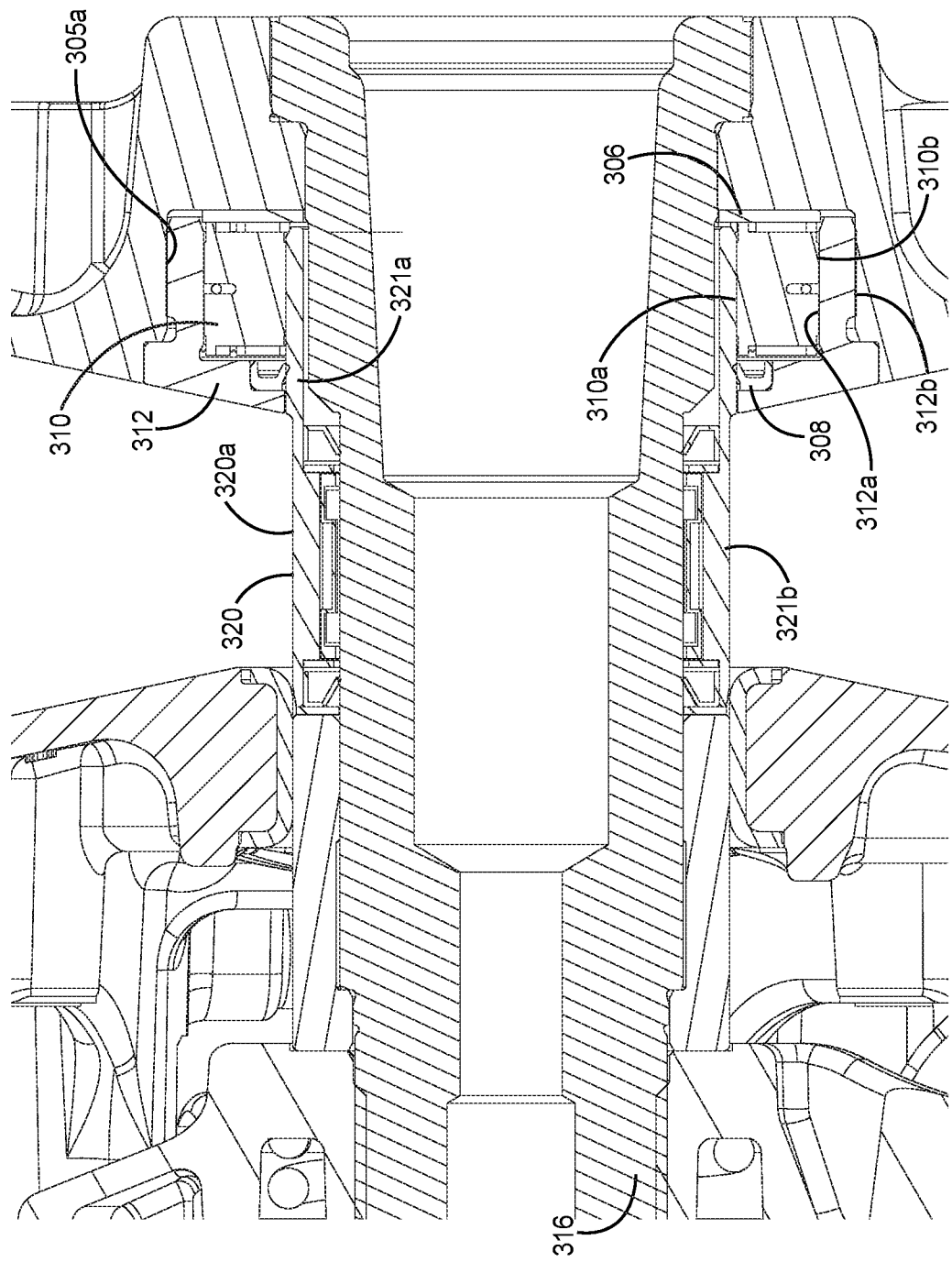
FIG. 14 is a close up cross-sectional view of a one-way rotational assembly of the drive clutch of FIG. 12.

FIG. 13 illustrates a cross-sectional assembled view of drive clutch 300 and FIG. 14 illustrates a partial close up view of the drive clutch 300 focusing on the idler bearing 320 and sprag 310 and sprag housing 312 configuration that form the one-way rotational assembly. In this embodiment, an inner surface 310a of a the sprag 310 engages the outer surface 320a of the first portion 321a of the idler bearing 320 in a tight fit to prevent rotation between the inner surface 310a of the sprag 310 and the idler bearing 320. An outer surface 310b of the sprag 310 engages an inside surface 312a of the sprag housing 312 also in a tight fit to prevent rotation of the outer surface 310b of the sprag 310 in relation to the sprag housing 312. An outer surface 312b of the sprag housing 312 in turn engages an inner wall 305a of the central cavity 305 in a tight fit to prevent rotation of the sprag housing in relation to the fixed sheave 304. This can also be engaged by a threaded, splined, or knurled connection as well as other methods. In operation, the sprag 310 allows the idler bearing 320 to rotate freely on the post 316 in a first direction to allow for the idling of the vehicle while preventing rotation of the idler bearing 320 in relation to the fixed sheave 304 and post 316 in a second direction to allow for engine braking. Although, the outer surface 320 of the idler bearing 320 in FIGS. 12-14 is illustrated as a smooth surface in this embodiment, in other embodiments, cogs may extend from the outer surface as discussed above and below.

Figure 15:
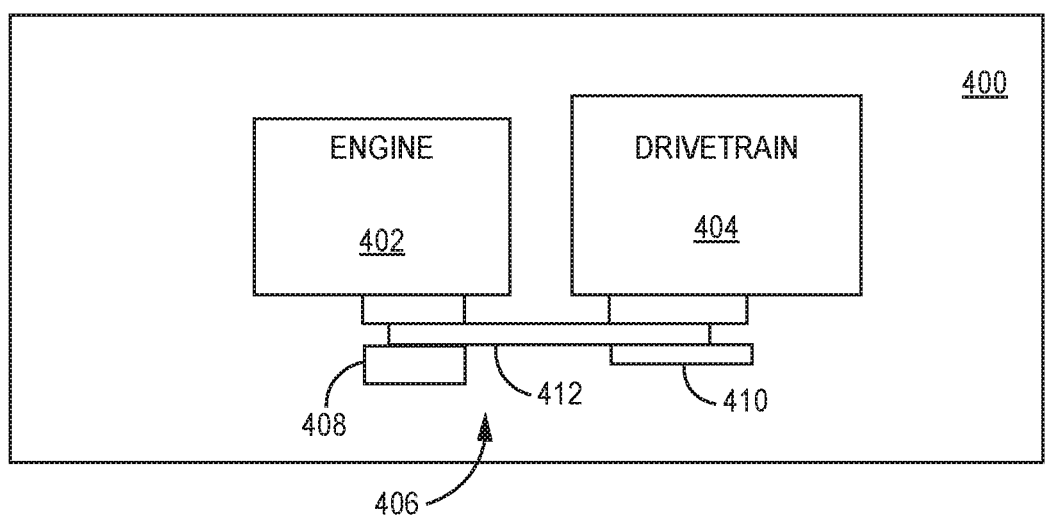
FIG. 15 is a block diagram of a vehicle implementing a one-way rotational assembly for engine braking according to one exemplary embodiment.
Figure 16:
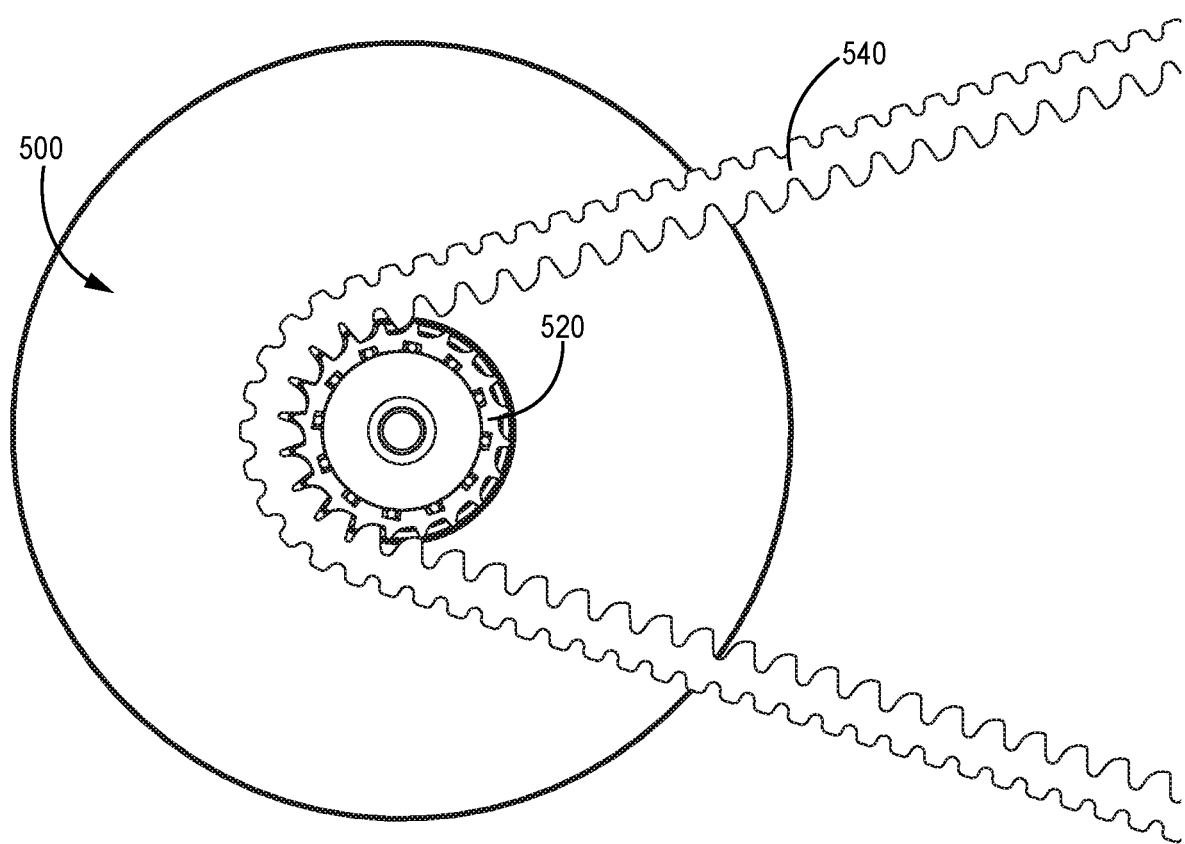
FIG. 16 is a side view of a belt-idler bearing arrangement according to one exemplary embodiment.

Referring to FIG. 15 a block diagram of vehicle 400 of an example embodiment is illustrated. The vehicle 400 includes an engine or motor 402 that provides engine torque. The engine torque is provided to a CVT 406. In particular, a drive clutch 408 is coupled to an output of the engine. Examples of drive clutches that may be used to provide an engine braking feature are discussed above. A belt or endless loop 412 transfers torque between the drive clutch 408 and the drivetrain 404 via a driven pulley 410 (driven gear or a driven clutch in another embodiment). Examples of belt embodiments are described above and below. The driven pulley 410 transfers torque between the drive clutch 408 and the rest of a drivetrain 404. The drivetrain 404 may further include transmission gearing, drive shafts, differentials, half shafts, wheels, tracks, propellers etc. During an engine braking condition, torque generated by the drivetrain and passing through the driven gear 410 and belt 412 is trying to overrun the drive clutch 408. However, the engine braking function of the drive clutch/belt configurations, discussed above, lock the output of the engine to the drivetrain to provide engine braking in this situation.

Figure 17:
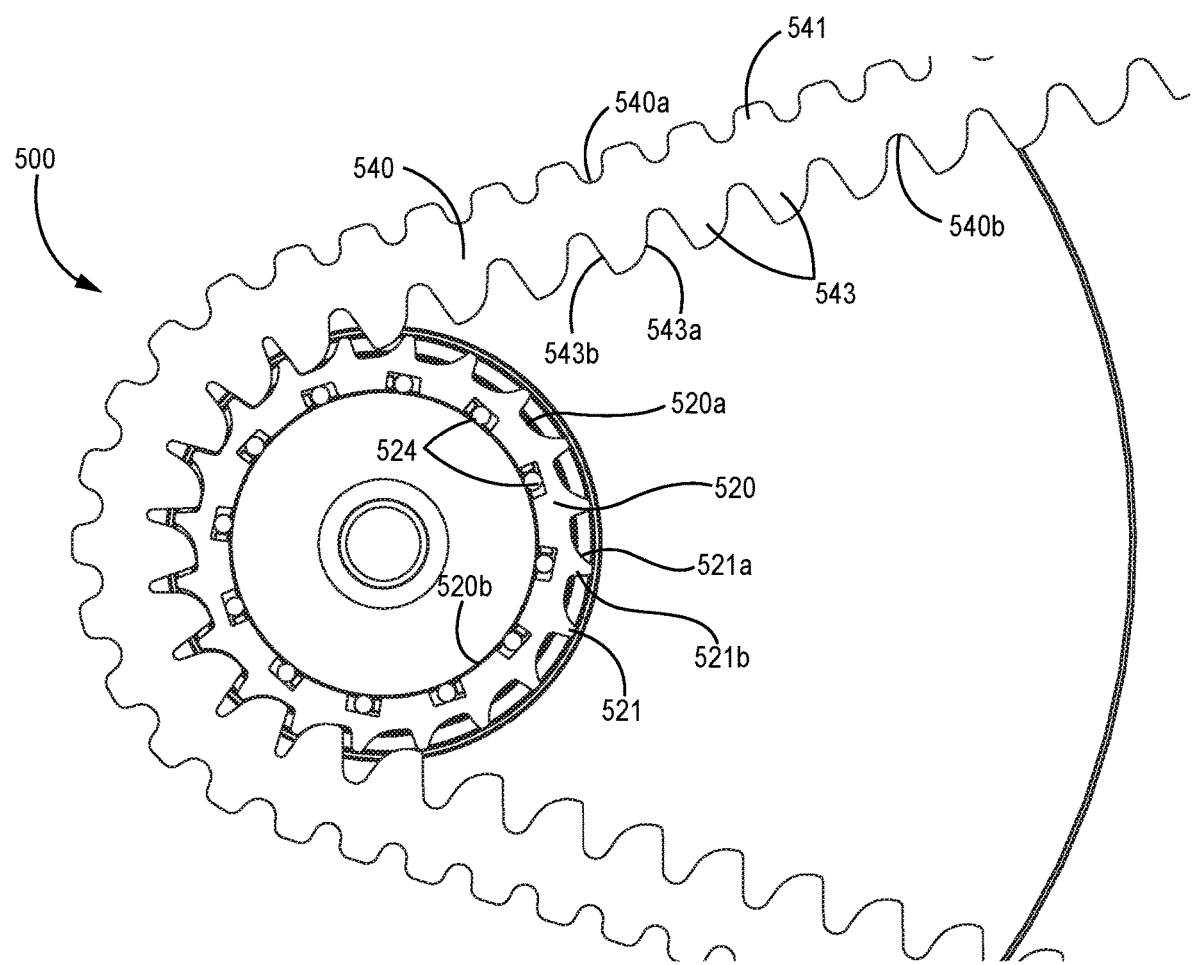
FIG. 17 is a close up side view of the belt-idler bearing arrangement of FIG. 16.

FIGS. 16 through 20 further illustrated another embodiment of a belt/idler bearing arrangement 500 of an example embodiment. In this example embodiment, as best illustrated in FIG. 17, the belt 540 has an outer surface 540a that includes outer belt teeth 541 and an inner surface 540b that includes inner belt teeth 543. The inner belt teeth 543 each include and are defined by a first tooth ramped surface 543a and an opposably positioned second tooth straight surface 543b.

The idler bearing 520 includes an outer surface 520a with cogs 521 and an inner surface 520b in which one way bearings assemblies 524 are partially housed (seated). The one way bearing assemblies 524 at least in part engage post 516. Each cog 521, extending from the outer surface 520a (or outer belt engaging surface) of the idler bearing 520, includes a first cog ramped surface 521a and a second cog straight surface 521b in this embodiment. The second cog straight surface generally extends radially from the outer belt engaging surface 520a. The belt/idler bearing arrangement 500 is configured so inner belt teeth 543 are received between the cogs 521 of the idler bearing 520 such that a first tooth ramp surface 543a of a tooth 543 engages a first cog ramped surface 521a of a cog 521 of the idler bearing 520 and a second tooth straight surface 543b of a tooth 543 engages a second cog straight surface 521b of a cog 521 of the idler bearing 520. The second tooth straight surface 543b/second cog straight surface 521b connection provides better friction between the belt 540 and the idler bearing 520 during back driving torque situations to prevent slippage.

Figure 18:
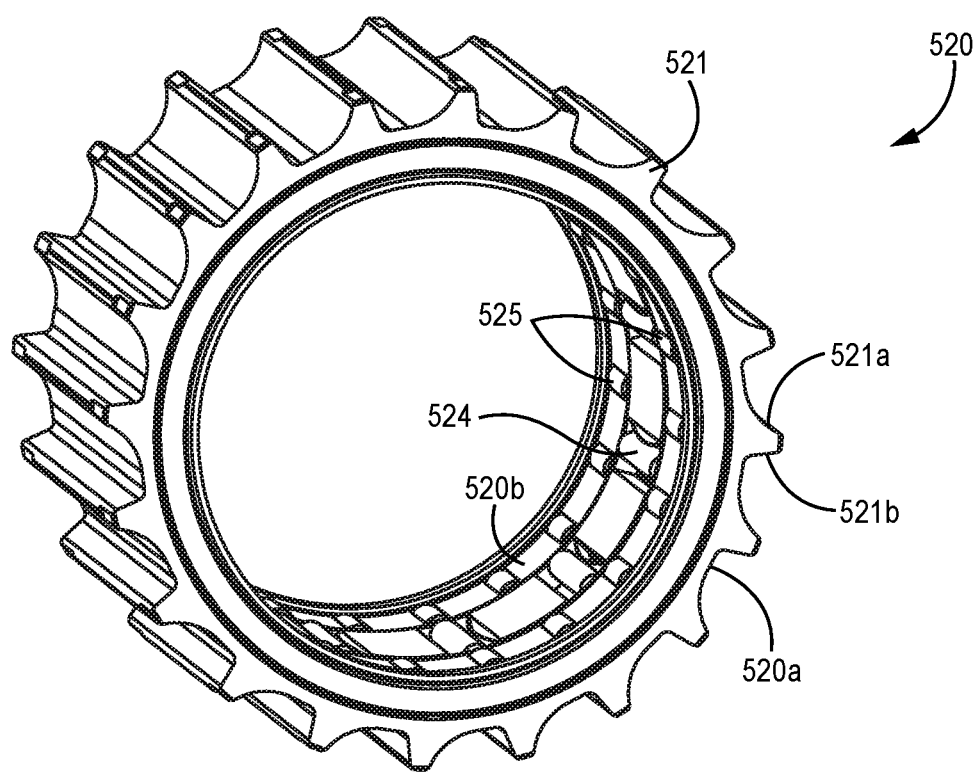
FIG. 18 is a side perspective view of an idler bearing of the belt-idler bearing arrangement of FIG. 16.
Figure 19:
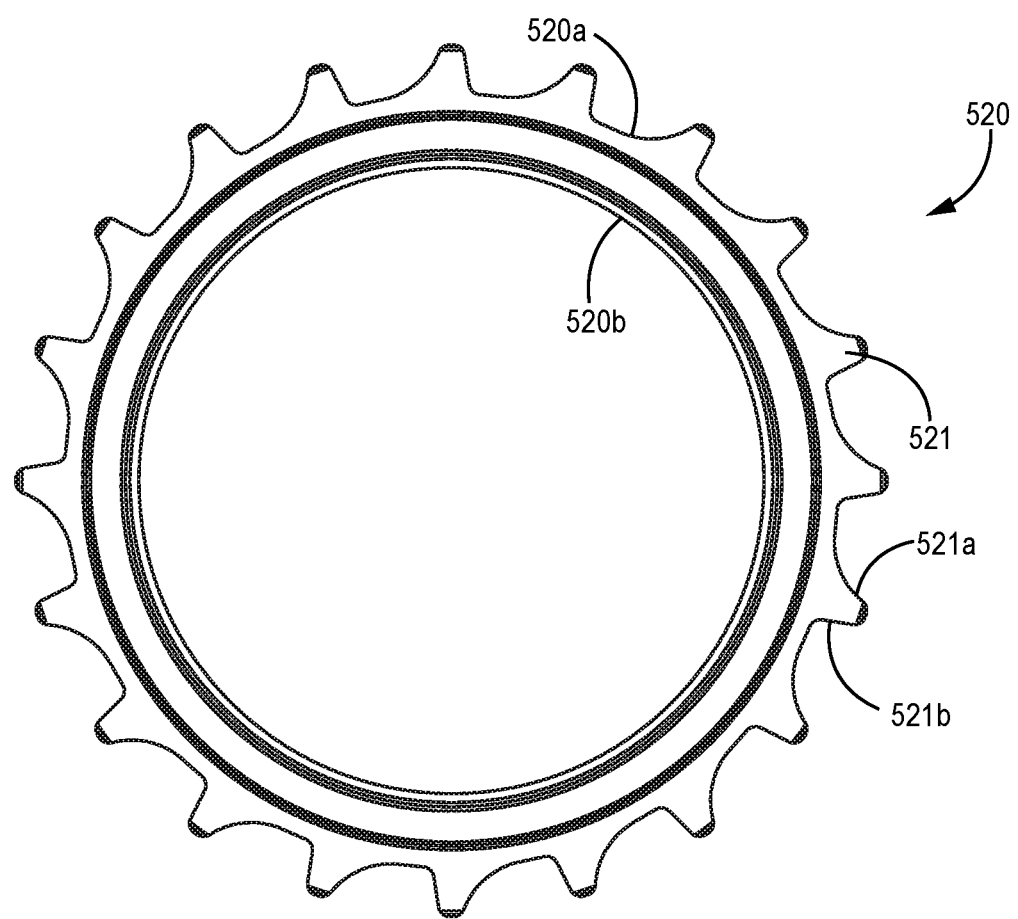
FIG. 19 is a side view of the idler bearing of the belt/idler bearing arrangement of FIG. 16.
Figure 20:
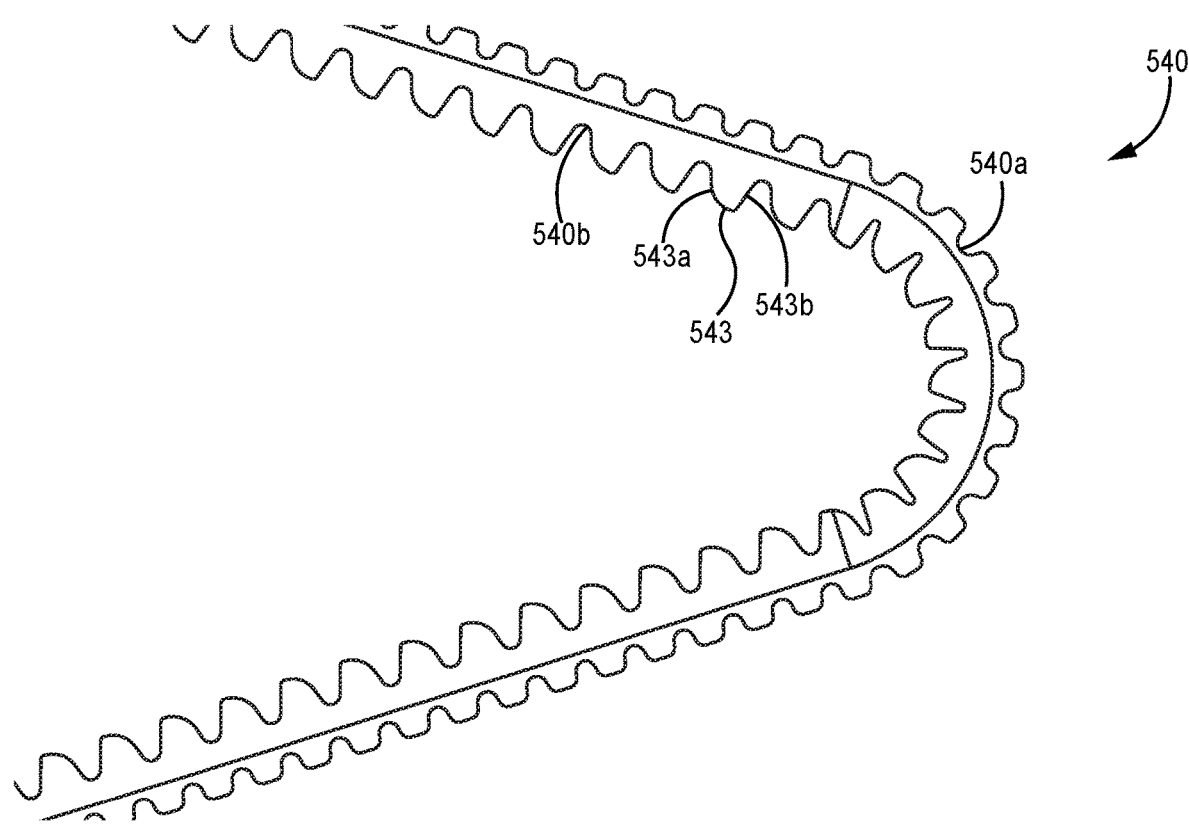
FIG. 20 is a side view of a belt of the belt/idler bearing arrangement of FIG. 16.

FIG. 18 further illustrates the idler bearing 520 also includes additional bearings 525 that are partially seated in the inner surface 520b of the idler bearing 520. The one way bearing assemblies 524 are positioned between rows of the additional bearings 525 in this embodiment. The rows of additional bearings further reduce friction between the post 516 and the idler bearing 520 during idle. The side view of the idler bearing 520 of FIG. 19 further illustrates the shape of the cogs 521 of idle bearing 520 in this example. As illustrated, each cog includes a first cog ramped surface 521a and a second cog straight surface 521b. FIG. 20 illustrates a side view of belt 540 that includes inner belt teeth 543. Each inner belt teeth 543 include a first tooth ramp surface 543a and a second tooth straight surface 543b. As discussed above, the inner belt teeth 543 are designed to be received between the cogs 521 of the idle bearing 520. Further the belt 540 includes outer belt teeth 541 to aid in the cooling of an associated CVT system and the flexibility of the belt 540.

Figure 21:
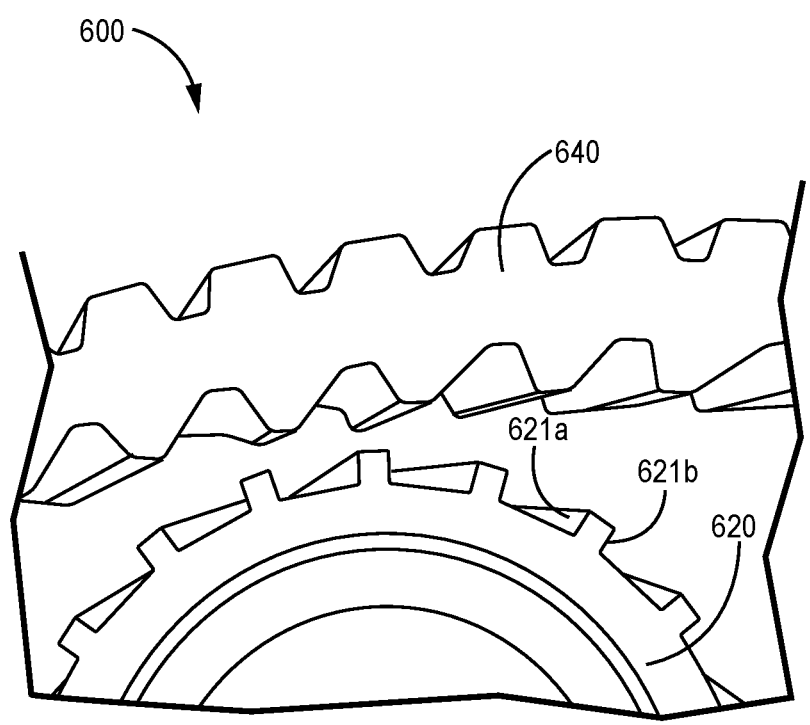
FIG. 21 is a side perspective view of another belt/idler bearing arrangement according to one exemplary embodiment.
Figure 22:
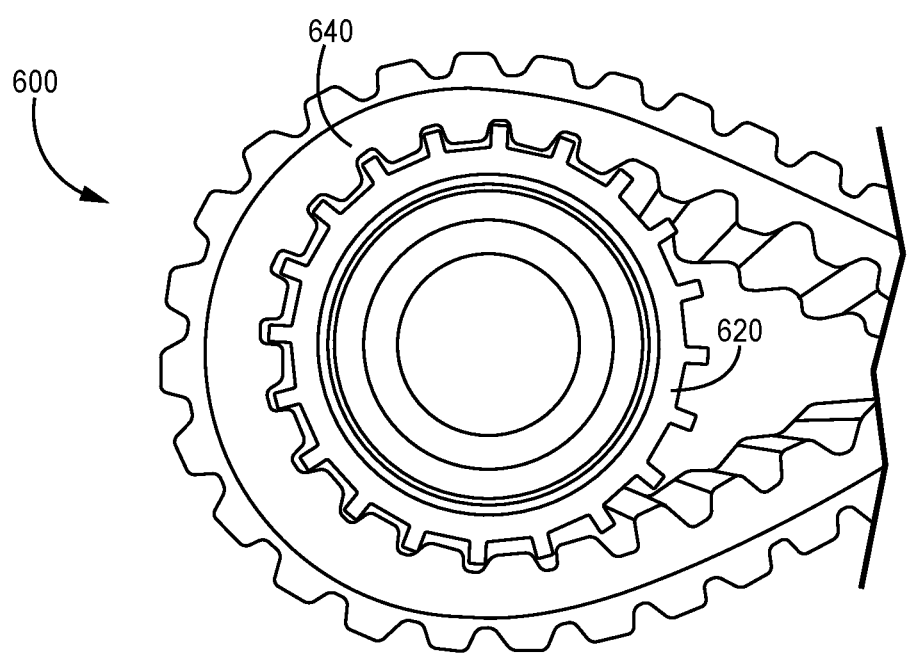
FIG. 22 is a side view of the belt/idler bearing arrangement of FIG. 21.
Figure 23:
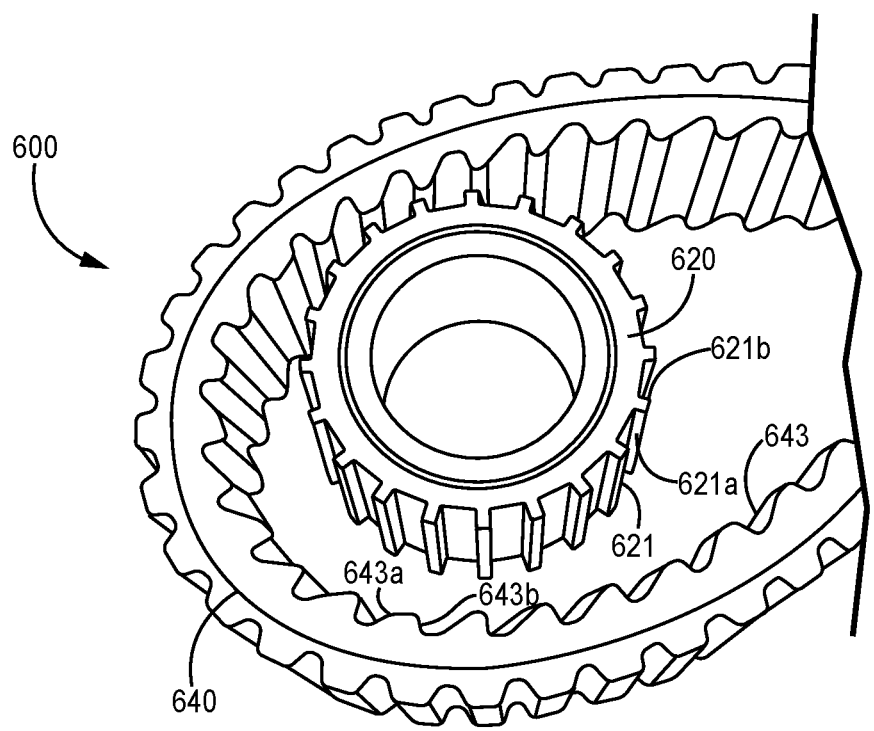
FIG. 23 is a side perspective view of the belt/idler bearing arrangement of FIG. 21.

FIGS. 21-23 further illustrate another embodiment of a belt-idler bearing arrangement 600. In this example embodiment, the belt 640 is similar to belt 540 discussed above with interior teeth 643 each having a first tooth ramp surface 643a and a second tooth straight edge surface 643b. The idler bearing 620 in this embodiment, includes cogs 621 that are generally defined by straight surfaces 621a and 612b that radially extend from an outer surface 620a of the idle bearing. The cogs 621 are configured to engage the first tooth ramp surface 643a and a second tooth straight edge surface 643b of the belt 640. Hence, the shape of the surfaces that define the cogs of the belts and define the teeth of the idle bearings in belt/idler bearing arrangements can be shaped to achieve a desired frictional connection to transmit a desired back-driving torque during engine braking for a specific application.

Although, embodiments described above as the idler bearing having cogs and the belt having teeth, the terms cogs and teeth are interchangeable. Hence, the idler bearing can be described as having teeth and the belt can be described as have cogs.

EXAMPLE EMBODIMENTS

Example 1 includes a drive clutch having an engine braking feature for a continuously variable transmission. The drive clutch includes a post, a fixed sheave, a movable sheave assembly and an idler bearing. The post is configured to be coupled to an output of an engine. The fixed sheave is coupled to the post. The fixed sheave has a fixed sheave belt engagement face. The movable sheave assembly is mounted on the post. The movable sheave assembly has a movable sheave belt engaging face that is configured to move axially on the post to move the movable sheave belt engaging face in relation to the fixed sheave belt engaging face depending on a rotational speed of the drive clutch. The idler bearing is mounted on the post at least in part between the movable sheave belt engaging face of the movable sheave assembly and the fixed sheave belt engaging face of the fixed sheave. The idler bearing includes a one-way rotational assembly that allows rotation of the idler bearing in relation to the post in a first direction and prevents rotation of the idler bearing in a second direction to provide engine braking assistance. The idler bearing further has an outer belt engaging surface with outward extending cogs.

Example 2 includes the drive clutch of Example 1, wherein the outward extending cogs of the idler bearing extend across the outer belt engaging surface at least a distance of a width of an inner surface of a belt used to convey torque between the drive clutch and a drive train of a vehicle.

Example 3 includes the drive clutch of Example 1, wherein the outward extending cogs of the idler bearing extend across the outer belt engaging surface less than the width of an inner surface of a belt used to convey torque between the drive clutch and a drive train of a vehicle.

Example 4 includes the drive clutch of any of the Examples 1-3, wherein the shape of the outward extending cogs are selected to create a desired friction between the idler bearing and a belt used to convey torque between the drive clutch and a drive train of a vehicle.

Example 5 includes the drive clutch of any of the Examples 1-4, wherein each cog includes at least one cog ramp surface.

Example 6 includes the drive clutch of any of Examples 1, 3-5, wherein the outer belt engaging surface of the idle bearing includes a first portion that has a first diameter and a second portion that has a second smaller diameter, the outward extending cogs extending from the second portion of the outer belt engaging surface.

Example 7 includes the drive clutch of any of the examples 1-6, wherein the one-way rotational assembly is received within a central recess of the fixed sheave.

Example 8 includes a vehicle with a continuously variable transmission with an engine braking function. The vehicle includes an engine to produce torque. A continuously variable transmission, drivetrain and a belt. The continuously variable transmission includes a drive clutch and a driven clutch. The drive clutch includes a post, a fixed sheave, a movable sheave assembly and an idler bearing. The post is coupled to an output of the engine. The fixed sheave is coupled to the post. The fixed sheave has a fixed sheave belt engagement face. The movable sheave assembly is mounted on the post. The movable sheave assembly has a movable sheave belt engaging face that is configured to move axially on the post to move the movable sheave belt engaging face in relation to the fixed sheave belt engaging face depending on the rotational speed of the drive clutch. The idler bearing is mounted on the post at least in part between the movable sheave belt engaging face of the movable sheave assembly and the fixed sheave belt engaging face of the fixed sheave. The idler bearing included a one-way rotational assembly that allows rotation of the idler bearing in relation to the post in a first direction and prevents rotation of the idler bearing in a second direction to provide engine braking assistance. The idler bearing has an outer belt engaging surface with outward extending cogs. The belt is used to convey torque between the drive clutch and the drivetrain. The belt includes an inner surface having teeth that are configured to engage the cogs of the idler bearing when the movable sheave belt engaging face of the movable sheave assembly is positioned at least a distance of a width of the belt away from the fixed sheave belt engaging face of the fixed sheave.

Example 9 includes the continuously variable transmission engine braking system of Example 8, wherein the outward extending cogs of the idler bearing extend across the outer belt engaging surface of the idler bearing a distance of a width of the inner surface of the belt.

Example 10 includes the continuously variable transmission engine braking system of Example 8, wherein the outward extending cogs of the idler bearing extend across the outer belt engaging surface of the idler bearing a distance of less than a width of the inner surface of the belt.

Example 11 includes the continuously variable transmission engine braking system of Example 8, wherein the teeth of the belt extend across the entire width of the inner surface of the belt.

Example 12 includes the continuously variable transmission engine braking system of Example 8, wherein the teeth of the belt extend across less than the width of the inner surface of the belt.

Example 13 includes a belt for a continuously variable transmission. The belt includes an inner surface that has inner protruding teeth that are configured to engage cogs of an idler bearing of a drive clutch when a movable sheave belt engaging face of a movable sheave assembly of the drive clutch is positioned at least a distance of a width of the belt away from a fixed sheave belt engaging face of a fixed sheave of the drive clutch.

Example 14 includes the belt of Example 13, wherein the inner protruding teeth of the belt extend across a width of the inner surface of the belt.

Example 15 includes the belt of Example 13, wherein the inner protruding teeth of the belt extend partially across a width of the inner surface of the belt.

Example 16 includes the belt of any of the Example 13-15, wherein the belt include an outer surface, the outer surface including outer protruding teeth.

Example 17 includes the belt of any of the Examples 13-16, wherein each inner protruding tooth is defined by a ramp surface and generally a straight edge surface.

Example 18 includes a drive clutch of a continuously variable transmission having an engine braking function. The drive clutch includes a post, a fixed sheave, a movable sheave assembly and idler bearing and a one-way rotational assembly. The post is configured to be coupled to an output of an engine. The fixed sheave is coupled to the post. The fixed sheave has a fixed sheave belt engagement face and a central recess. The movable sheave assembly is mounted on the post. The movable sheave assembly having a movable sheave belt engaging face that is configured to move axially on the post to move the movable sheave belt engaging face in relation to the fixed sheave belt engaging face depending on the rotational speed of the drive clutch. The idler bearing is mounted on the post. The idler bearing has a first portion that is positioned at least in part between the movable sheave belt engaging face of the movable sheave assembly and the fixed sheave belt engaging face of the fixed sheave and a second portion received within the central recess of the fixed sheave. The one-way rotational assembly is received within the central recess of the fixed sheave. The one-way rotation assembly engages the idler bearing to allow the idler bearing to rotate in relation to the post in a first direction and prevent rotation of the idler bearing in relation to the post in a second direction.

Example 19 includes the drive clutch of Example 18, wherein the one-way rotational assembly further includes a sprag and sprag housing. The sprag is received within the central recess of the fixed sheave. The sprag has an inner surface that is engaged with the second portion of the idler bearing. The sprag has a one-way rotation feature. At least a portion of the sprag housing is receive within the central recess of the fixed sheave. An inner surface of the sprag housing is received within the central recess engaging an outer surface of the sprag. An outer surface of the sprag housing is received within the central recess engaging an inner surface of the central recess of the fixed sheave.

Example 20 includes the drive clutch of any of the Examples 18-2, wherein the idler bearing has an outer belt engaging surface with outward extending cogs.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A drive clutch having an engine braking feature for a continuously variable transmission, the drive clutch comprising:
    a post configured to be coupled to an output of an engine;
    a fixed sheave coupled to the post, the fixed sheave having a fixed sheave belt engagement face and a central recess;
    a movable sheave assembly mounted on the post, the movable sheave assembly having a movable sheave belt engaging face that is configured to move axially on the post to move the movable sheave belt engaging face in relation to the fixed sheave belt engaging face depending on a rotational speed of the drive clutch;
    an idler bearing mounted on the post at least in part between the movable sheave belt engaging face of the movable sheave assembly and the fixed sheave belt engaging face of the fixed sheave; and
    a one-way rotational assembly received within the central recess of the fixed sheave, the one-way rotation assembly engaging the idler bearing to allow the idler bearing to rotate in relation to the post in a first direction and prevent rotation of the idler bearing in relation to the post in a second direction.

2. The drive clutch of claim 1, wherein the idler bearing has a first portion positioned at least in part between the movable sheave belt engaging face of the movable sheave assembly and the fixed sheave belt engaging face of the fixed sheave and a second portion received within the central recess of the fixed sheave.

3. The drive clutch of claim 2, wherein the one-way rotational assembly further comprises:
    a sprag received within the central recess of the fixed sheave, the sprag having an inner surface that is engaged with the second portion of the idler bearing, the sprag having a one-way rotation feature; and
    a sprag housing, at least a portion of the sprag housing receive within the central recess of the fixed sheave, an inner surface of the sprag housing received within the central recess engaging an outer surface of the sprag, an outer surface of the sprag housing received within the central recess engaging an inner surface of the central recess of the fixed sheave.

4. The drive clutch of claim 1, wherein the one-way rotational assembly includes a housing having a portion positioned between the engagement face of the fixed sheave and the idler bearing.

5. The drive clutch of claim 1, further comprising:
    a seal positioned to engage the one-way rotational assembly and the idler bearing.

6. The drive clutch of claim 1, further comprising:
    a thrust washer positioned between the one-way rotational assembly and an inner surface in the central recess of the fixed sheave.

7. The drive clutch of claim 1, wherein the idler bearing further has an outer belt engaging surface with outward extending cogs.

8. A vehicle with a continuously variable transmission with an engine braking function, the vehicle comprising:
    an engine to produce torque;
    a continuously variable transmission including,
    a drive clutch, the drive clutch including,
        a post coupled to an output of the engine,
        a fixed sheave coupled to the post, the fixed sheave having a fixed sheave belt engagement face and a central recess,
        a movable sheave assembly mounted on the post, the movable sheave assembly having a movable sheave belt engaging face that is configured to move axially on the post to move the movable sheave belt engaging face in relation to the fixed sheave belt engaging face depending on a rotational speed of the drive clutch,
        an idler bearing mounted on the post at least in part between the movable sheave belt engaging face of the movable sheave assembly and the fixed sheave belt engaging face of the fixed sheave, the idler bearing having a first portion positioned at least in part between the movable sheave belt engaging face of the movable sheave assembly and the fixed sheave belt engaging face of the fixed sheave and a second portion received within the central recess of the fixed sheave, and
        a one-way rotational assembly received within the central recess of the fixed sheave, the one-way rotation assembly engaging the idler bearing to allow the idler bearing to rotate in relation to the post in a first direction and prevent rotation of the idler bearing in relation to the post in a second direction;
    a drivetrain; and
    a belt to convey torque between the drive clutch and the drivetrain, the belt including an inner surface to engage the idler bearing when the movable sheave belt engaging face of the movable sheave assembly is positioned at least a distance of a width of the belt away from the fixed sheave belt engaging face of the fixed sheave.

9. The vehicle of claim 8, wherein the one-way rotational assembly further comprises:
    a sprag received within the central recess of the fixed sheave, the sprag having an inner surface that is engaged with the second portion of the idler bearing, the sprag having a one-way rotation feature; and a sprag housing, at least a portion of the sprag housing receive within the central recess of the fixed sheave, an inner surface of the sprag housing received within the central recess engaging an outer surface of the sprag, an outer surface of the sprag housing received within the central recess engaging an inner surface of the central recess of the fixed sheave.

10. The vehicle of claim 9, further comprising at least one of:

a thrust washer positioned between the sprag and an inner surface in the central recess of the fixed sheave; and a seal engaging the second portion of the idler bearing and positioned between the sprag housing and the sprag.

11. The vehicle of claim 8, wherein the idler bearing having an outer belt engaging surface with outward extending cogs.

12. The vehicle of claim 11, wherein the belt including an inner surface having teeth that are configured to engage the cogs of the idler bearing.

13. A drive clutch of a continuously variable transmission having an engine braking function, the drive clutch comprising:

a post configured to be coupled to an output of an engine;

a fixed sheave coupled to the post, the fixed sheave having a fixed sheave belt engagement face and a central recess;

a movable sheave assembly mounted on the post, the movable sheave assembly having a movable sheave belt engaging face that is configured to move axially on the post to move the movable sheave belt engaging face in relation to the fixed sheave belt engaging face depending on a rotational speed of the drive clutch;

an idler bearing mounted on the post, the idler bearing having a first portion positioned at least in part between the movable sheave belt engaging face of the movable sheave assembly and the fixed sheave belt engaging face of the fixed sheave and a second portion received within the central recess of the fixed sheave; and a one-way rotational assembly received within the central recess of the fixed sheave, the one-way rotation assembly engaging the idler bearing to allow the idler bearing to rotate in relation to the post in a first direction and prevent rotation of the idler bearing in relation to the post in a second direction.

14. The drive clutch of claim 13, wherein the one-way rotational assembly further comprises:

a sprag received within the central recess of the fixed sheave, the sprag having an inner surface that is engaged with the second portion of the idler bearing, the sprag having a one-way rotation feature; and a sprag housing, at least a portion of the sprag housing receive within the central recess of the fixed sheave, an inner surface of the sprag housing received within the central recess engaging an outer surface of the sprag, an outer surface of the sprag housing received within the central recess engaging an inner surface of the central recess of the fixed sheave.

15. The drive clutch of claim 13, wherein the idler bearing has an outer belt engaging surface with outward extending cogs.

16. The drive clutch of claim 14, further comprising:

a thrust washer positioned between the sprag and an inner surface in the central recess of the fixed sheave.

17. The drive clutch of claim 14, further comprising:

a seal engaging the second portion of the idler bearing and positioned between the sprag housing and the sprag.

* * * * *